(12) United States Patent
Campbell

(10) Patent No.: US 11,104,262 B2
(45) Date of Patent: Aug. 31, 2021

(54) CABLE AND LOCK FOR SECURING CARGO IN VEHICLES WITH A LOCKING TAILGATE

(71) Applicant: 8th Commandment Cable Company, LLC, Vicksburg, MS (US)

(72) Inventor: Joseph Lane Campbell, Vicksburg, MS (US)

(73) Assignee: 8th Commandment Cable Company, LLC, Vicksburg, MS (US)

( * ) Notice: Subject to any disclaimer, the term of this patent is extended or adjusted under 35 U.S.C. 154(b) by 201 days.

(21) Appl. No.: 16/546,859

(22) Filed: Aug. 21, 2019

(65) Prior Publication Data

US 2020/0062167 A1 Feb. 27, 2020

Related U.S. Application Data

(60) Provisional application No. 62/721,657, filed on Aug. 23, 2018.

(51) Int. Cl.
*B60P 7/08* (2006.01)
*B62D 33/023* (2006.01)

(52) U.S. Cl.
CPC ........... *B60P 7/0823* (2013.01); *B60P 7/0807* (2013.01); *B62D 33/023* (2013.01)

(58) Field of Classification Search
CPC ....... B60P 7/0823; B60P 7/0807; B60P 11/06; B62D 33/023; B60R 2011/0082; B60R 2011/0096
USPC .................. 410/96; 70/61, 49, 58, 258, 416
See application file for complete search history.

(56) References Cited

U.S. PATENT DOCUMENTS

| | | | | |
|---|---|---|---|---|
| 5,011,349 A * | 4/1991 | McAndrews | .......... | A44B 11/25 24/197 |
| 5,887,840 A * | 3/1999 | Hoffman | ............... | B60P 7/0807 248/503 |
| 6,155,622 A * | 12/2000 | Reed | .................. | B62D 33/0273 296/26.08 |
| 7,229,116 B1 * | 6/2007 | Bruford | .................... | B60P 3/40 296/26.08 |
| 7,488,021 B1 * | 2/2009 | Roos | ......................... | B60P 3/40 296/26.11 |
| 9,156,507 B1 * | 10/2015 | Reed | ..................... | B62D 33/037 |
| 2003/0127873 A1 * | 7/2003 | Reed | .................. | B62D 33/0273 296/26.08 |
| 2009/0309381 A1 * | 12/2009 | Nelson | ............... | B62D 33/0273 296/26.11 |

(Continued)

*Primary Examiner* — Hilary L Gutman
(74) *Attorney, Agent, or Firm* — John H. Thomas, P.C.

(57) ABSTRACT

The vehicle for use with the present system is a pickup truck or other work truck with an open cargo space. The cargo space is typically defined by a rectangular bed surrounded by fixed walls on three sides and a tailgate in the rear of the vehicle. The bottom of the cargo space is referred to as the floor or cargo bed floor. Cargo pillars are positioned at the two back corners of the cargo bed. They are also the structural support for a tailgate. The bottom of the tailgate is rotatably connected to the base of the pillars next to the cargo bed floor. When the tailgate is open or down, it is typically about parallel to the cargo bed floor. When the tailgate is up or closed, it is latched or locked to the upper end of the pillars. A fixed or retractable cable strap, chain, rope, or similar line is adapted to be locked together with the locking of a truck tailgate.

14 Claims, 23 Drawing Sheets

(56) References Cited

U.S. PATENT DOCUMENTS

| | | | |
|---|---|---|---|
| 2012/0263552 A1* | 10/2012 | Hooton | B60P 7/083 410/96 |
| 2012/0292360 A1* | 11/2012 | O'Regan | G09F 7/18 224/567 |
| 2013/0094930 A1* | 4/2013 | Kalergis | B60P 1/43 414/523 |
| 2018/0118280 A1* | 5/2018 | Marchlewski | B60Q 1/30 |
| 2018/0147976 A1* | 5/2018 | Stojkovic | B62D 33/03 |
| 2019/0100128 A1* | 4/2019 | Williams | B60P 7/0807 |
| 2019/0143934 A1* | 5/2019 | Tackett | B60R 22/4619 242/379.2 |
| 2019/0210509 A1* | 7/2019 | Hemphill | B60P 7/0807 |
| 2019/0210510 A1* | 7/2019 | Campbell | B60P 7/0807 |
| 2019/0225137 A1* | 7/2019 | Williams | B60P 7/0807 |
| 2021/0031670 A1* | 2/2021 | Andersson | B60P 7/0815 |

\* cited by examiner

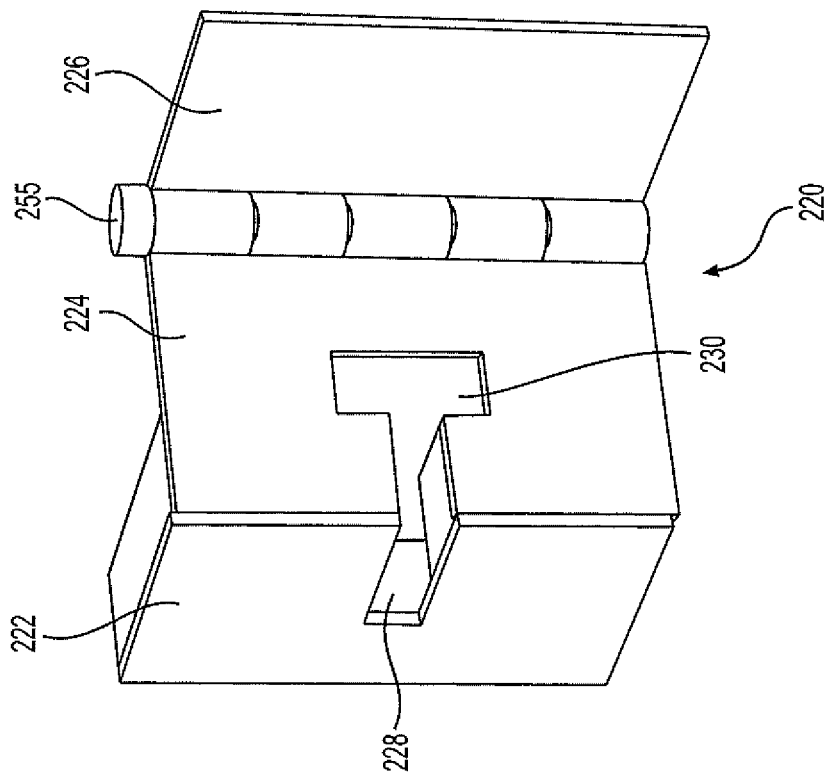
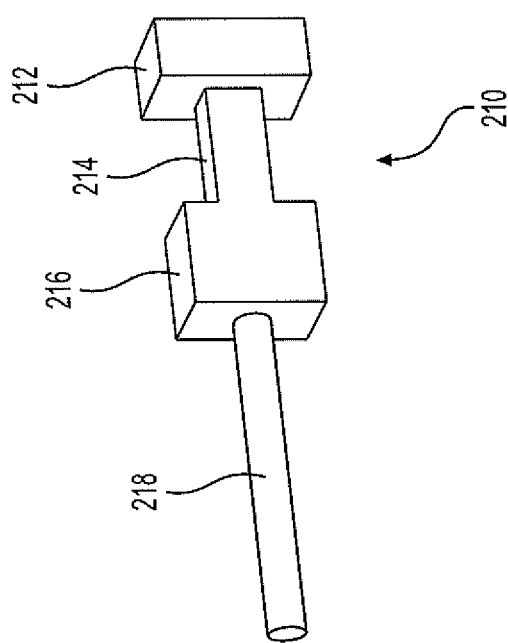
FIG. 22

CABLE AND LOCK FOR SECURING CARGO IN VEHICLES WITH A LOCKING TAILGATE

This application claims the benefit of filing of U.S. Provisional Patent Application No. 62/721,657 filed Aug. 23, 2018, which is incorporated by reference herein in its entirety.

The present invention is directed to the use of a cable, strap, chain, rope, or similar line together with a locking key for use in securing cargo in a vehicle cargo bed, and especially in a cargo bed that has a locking tailgate.

BACKGROUND

Some vehicles like utility vehicles, pickup trucks and work trucks most often have open cargo beds. These cargo beds enable easy access for loading and unloading many different items. This easy and open accessibility, however, has its problems. Specifically, items placed in an open cargo bed are easy targets for theft. More generally, unsecured cargo can be blown from the bed area of a vehicle at speed.

Several well-known countermeasures are available to help prevent theft. The first solution is the classic toolbox that can be mounted across a bed or down one or both sides of a bed. In-bed mounted toolboxes are effective anti-theft devices, but they take up a large amount of valuable cargo space. A second answer is a cargo bed cover, that has an additional benefit of being a weather protector to items placed on the cargo bed. These bed covers, however, are expensive and often easy to breach, they limit the height of the cargo that may be transported, and they are bulky and can take up considerable space in the cargo bed. Finally, there are many cargo-specific devices such as for instance bicycle carriers and motor cycle carriers that can be mounted in a bed and used. Again, these are bulky and can be difficult to handle.

SUMMARY

Accordingly, it is an object to overcome the shortcomings of existing devices that help protect items from theft by providing a fixed or retractable cable strap, chain, rope, or similar line together with a key that is adapted to be locked and secured by the closing and the locking of a vehicle tailgate.

In one example, a cable locking system for use with vehicles having a tailgate comprises a vehicle having a cargo bed, wherein the cargo bed has a tailgate mounted on one end of the cargo bed and the tailgate having rotating open down and up latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed. A length of cable has a first end of the cable and a second end of the cable that is fixed to the cargo bed. A lug is fixed onto the first end of the cable having a groove across its width and an end block having a diameter greater than a diameter of the groove. A contoured key has an open slot that is sized to slide across the lug groove and wherein the lug block is too large to come out of the slot; and further wherein the contoured key fits into the empty space between the closed tailgate and the corresponding pillar that it is attached to whereby a cable may be pulled from the cable spool and the lug may be inserted into the key so that the key and lug are locked when the tailgate is closed. The cable spool may be fixed underneath the floor of the cargo bed. The system may further comprise a tool box mounted in the cargo bed, and wherein the cable spool is fixed inside the tool box. The lug may be round or rectangular in cross-section. The open slot of the contoured key may be positioned in a first end of the contoured key, and a second end of the contoured key opposite the first end has a Z-shape as defined by two 90 degree turns. The second end of the contoured key may be fixed to the pillar face by screws.

In another example, a cable locking system for use with vehicles having a tailgate comprises a vehicle having a cargo bed, wherein the cargo bed has a tailgate mounted on one end of the cargo bed and the tailgate having rotating open down and up latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed. A length of cable has a first end of the cable and a second end of the cable that is fixed to the cargo bed. A lug is fixed onto the first end of the cable having a groove across its width and an end block having a diameter greater than a diameter of the groove. A contoured key has an open slot that is open to the distal end of a first end of the key, and the slot is sized to slide across the lug groove and wherein the lug block is too large to come out of the slot; and further wherein the contoured key fits into the empty space between the closed tailgate and the corresponding pillar that it is attached to. The pillar has a hole therein that is sized slightly larger than the diameter of the outside of the lug end block, wherein the lug fits inside the hole in the pillar, whereby a cable is pulled from the cable spool and the lug is inserted into the hole in the pillar and the key is then slid across the lug groove so that the key and lug are locked when the tailgate is closed. The lug may be rectangular or round in cross-section. A second end of the contoured key opposite the first end may have a Z-shape as defined by two 90 degree turns. The second end of the contoured key may be fixed to the pillar face by screws.

In a still further example, a cable locking system for use with vehicles having a tailgate comprises a vehicle having a cargo bed, wherein the cargo bed has a tailgate mounted on one end of the cargo bed and the tailgate having rotating open down and up latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed. The system also has a length of cable having a first end of the cable and a second end of the cable that is fixed to the cargo bed, and a lug fixed onto the first end of the cable having a groove across its width and an end block having a diameter greater than a diameter of the groove. A contoured key has an open slot that is open to the proximal end of a first end of the key, and the slot is sized to slide across the lug groove and wherein the lug block is too large to come out of the slot; and further wherein the contoured key fits into the empty space between the closed tailgate and the corresponding pillar that it is attached to. Wherein the contoured key further comprises a hinge that allows the first end of the key to rotate forward and back and the forward position is next to and parallel to the longitudinal face of the pillar, whereby a cable is pulled from the cable spool and the lug is inserted into the slot in the key so that the key and lug are locked when the tailgate is closed. The key may have a second end opposite the first end and the second end comprises the hinge, and the second end further defines a Z-shape with two 90 degree turns when the first end is rotated next to the longitudinal face of the pillar. The contoured key may comprise a second open slot that is open to the proximal end of the first end of the key, and the slot is sized to slide across a second lug groove and wherein a second lug block is too large to come out of the slot.

BRIEF DESCRIPTION OF THE DRAWINGS

FIG. 22 is a perspective view of an alternative lug and key shape as described herein.

DETAILED DESCRIPTION

Figure 1:
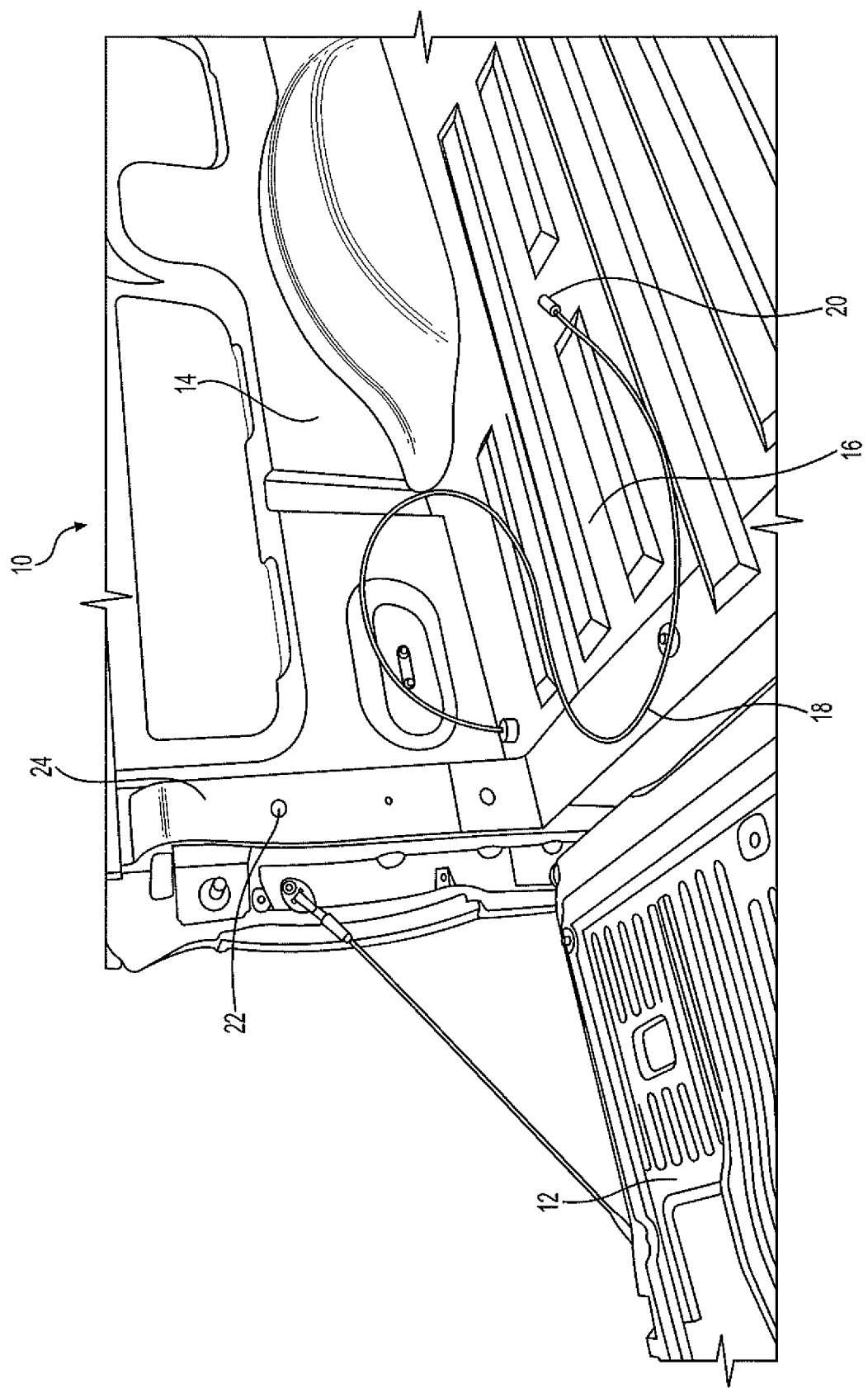
FIG. 1 is a perspective view of the back of a truck having a retractable cable installed on it.

Some vehicles, especially many modern pickup trucks, similar work trucks, utility vehicles, and all-terrain vehicles have lockable tailgate systems. The present securing systems take advantage of a locking tailgate so that the process of locking the tailgate will also lock a retractable locking cable, or similar line device that may secure cargo in the cargo bed of the truck. The system uses a retractable or fixed spool of cable where the cable can be unwound and used as a locking device, or the cable can be retracted and substantially out of a work space in the truck cargo bed.

The vehicle for use with the present system is a pickup truck or other similar work truck or utility vehicle with an open cargo space. As noted earlier, easy access to a cargo bed means easy use but also easy mischief for a thief or vandal. Further, items in the cargo bed are susceptible to simply being blown out of the cargo area of a vehicle at speed. The cargo space is typically defined by a rectangular bed surrounded by fixed walls on three sides and a tailgate in the rear of the vehicle. The bottom of the cargo space is referred to as the floor or cargo bed floor. Cargo pillars are positioned at the two back corners of the cargo bed. The pillars help support the respective sidewalls. They are also the structural support for the tailgate. The bottom of the tailgate is rotatably connected to the base of the pillars next to the cargo bed floor. When the tailgate is open or in the down position, it is typically approximately parallel to the cargo bed floor. When the tailgate is up or in its closed position, it is approximately perpendicular to the cargo bed floor. In this up and closed position, the tailgate is latched or locked to the upper end of the pillars.

The spool is a retractable reel of flexible and strong cable. The spool may have different lengths of cable wound up therein. The cable may alternatively be simply fixed to a bed and carried loosely in the bed. For the purposes of the present system, there is typically about 6 to 30 or more feet of cable, or alternatively about 12 to 25 feet of cable. The cable may be formed of a coated steel or other metal braid or other flexible material. The cable can have a cross-sectional thickness of about one-eighth to one-half of an inch or other thickness as appropriate for the flexible cable. In addition to a spool of cable, a chain may alternatively be used. The chain may be stored loosely in the cargo bed or it may also be wound into a spool. A combination of chain and cable may be used, for instance, as a long chain with a short cable leader on its end, or vice versa.

A lug is fixed to the end of the cable that may be retracted from the spool in the example of a retractable spool. The opposite end of the cable from the lug is fixed to the inside of the spool. Alternatively, the opposite end of the cable is secured to the bed or some box or cabinet otherwise secured to the bed. The lug is a rigid piece with a groove around its circumference in a middle portion of the lug. Alternatively, the groove is across a middle portion of the lug in a direction that is substantially perpendicular the linear length of the lug. There may be parallel grooves on opposite sides of the lug across the middle portion of the lug. It is only operationally important that the distal end of the lug is a block portion that is wider than the groove diameter. The cross section of the lug may be round in most examples, but it may also be square or hexagonal or some other symmetrical or asymmetrical geometry. The lug is typically formed of steel or aluminum or other rigid metal, but it may also be formed of a strong polymer or composite material. The lug may have a longitudinal length of about 1 to 4 inches, or alternatively about 2 to 3 inches.

A locking mechanism in the form of a contoured key is a flat and metallic piece with an open slot in a first end of the key. This slot is sized to be larger in width than the groove of the cable lug but smaller in width than the block end of the lug. In this way, the lug, once slid into the groove of the key, is secured in the groove and cannot be removed in the direction perpendicular to the groove. The second end of the key on the opposite end from the first end is adapted to be secured between a tailgate and pillar when the tailgate is closed next to the pillar. It is believed that virtually all truck tailgates have a small gap between the tailgate and pillar after they are closed. In order to be secure between the tailgate and pillar, the second end of the key is contoured to be able to be secure when the tailgate is closed. To accomplish this, the second end of the key will have at least two approximately 90 degree turns in it to form a zig-zag or Z-shape. Additional turns are optional and may be used to contour with a specific truck model. The 90 degree turns correspond to the edges of the contour of the pillar. With two 90 degree turns, the second end of the key is wedged into place between pillar and tailgate and cannot be simply pulled out. Thus, the lug is secure in the first end of the key and the key is secure between the tailgate and pillar.

There are multiple options to configure the key and cable lug so that the lug is locked into the key when the tailgate is closed. In each case, the second end of the key has the zig-zag or Z-shape so that the key is secured upon closing of a tailgate. The system works with the contour of the space between the closed tailgate and the pillar of the truck bed. This space can be utilized by creating a key with the face of the key that contacts the pillar to lie flat against the contours of the truck bed and filling the empty space between the closed tailgate and the pillar. This will compress the key in place when the tailgate is closed and cannot be removed without lowering the tailgate. The key itself must be precisely machined to follow the contour of the pillar. A rugged steel plate, in one example 16-gauge steel, will fit in the gap between the closed tailgate and the pillar. The throat of the key must be slightly wider than the thickness of a link in the chain or slightly thicker than the inside diameter of the groove machined into the lug. The face of the key touching the pillar may be held in place by magnets for steel beds or adhesive tape/Velcro for non-ferrous (aluminum) beds. The outside or flat faces of the key may have rubber pads adhered to them to aid in compression and to prevent metal on metal contact when the key is compressed by the closing tailgate. The contour of the pillars is different by manufacturer of the truck. However, most pillars are the same across the manufacturer's line of trucks. The factory holes in the pillar may even be on the opposite side of the pillar from the tailgate. Also, the owner of the truck may drill holes in the pillar. The same principle will apply in all of these truck pillar and hole configurations. The key will need to be made longer with an extra bend to reach the rear of the pillar.

The first end of the key may have two or more throats (also referred to as slots) therein to receive multiple lugs to lock therein. In the example of two slots, there may be one end of two different cables or chains able to be secured therein. However, it is also possible to secure both ends of the same cable in one key having two slots therein.

The second end of the key may alternatively be secured to the pillar to reinforce the security of the key in the gap between the pillar and tailgate when closed. The second end can be bolted or screwed to the pillar. For instance, a factory installed tailgate has a tailgate latch bolt that may be used to secure also the second end of the key to the pillar. The second end can be fixed by adhesive or a magnet to the pillar, of course in the instance of a steel pillar, or by welding or soldering. Alternatively, the key may be a loose piece that is secured by the friction fit between the tailgate and pillar faces. A friction fit may be enhanced with some rubber or foam cushion on the second end of the key or also on the pillar and tailgate faces where the key fits in between. Specific examples, without limitation, of key and lug combinations are discussed in the figures herein.

In one example, the system itself has three main components: 1) a cable or chain or like material; 2) the shape of the lug at the end of the cable or the diameter of the link of chain, and 3) the structure of the vehicle bed including its factory made holes, or a fabricated hole, in the pillar on a face of the pillar on the inside the bed, and the functioning of the tailgate and its locking system. When a lug is used, the lug must have a diameter slightly smaller than the factory hole or fabricated hole in the pillar inside the bed that supports the body panels, tail light cluster, and the tailgate. The lug is then machined to have a groove around its circumference wherein the groove has a diameter less than the diameter of the distal head portion of the lug. This groove will be slightly wider than the thickness of the key, and the inside diameter of the groove must be slightly smaller than the width of the open slot or throat of the key. In the example of a round cross section lug, the orientation of the lug is irrelevant as it is radially symmetrical. However, alternatively, the lug may have a square or star or hexagonal or other geometric shape that has at least two parallel sides and the groove machined therein to receive the key slot or throat. When the lug has a different cross section shape, it is only important that its largest outside diameter is still able to be inserted into the factory or fabricated hole in the pillar.

If a chain is used, then the diameter of the chain must be slightly less than the diameter of the factory or fabricated hole. A link or links of the chain are placed in the hole in the pillar. The next link can then be bound by the key to keep the chain from being removed from the hole. Therefore, the slot or throat of the key must be slightly wider than the thickness of the link but still less than the width of the link.

The spool can be fixed in any one of multiple positions around the vehicle cargo bed. The spool may be anchored underneath the cargo bed floor adjacent a hole drilled through or formed in the floor from which the lug and cable can be unwound inside the cargo space. The cargo bed may have one or more toolboxes mounted therein. The spool may be fixed inside a tool box and proximate a hole in the tool box through which the lug and cable may be unwound into the open bed. And, there may be more than one spool mounted around a vehicle cargo bed so that the cable is near a strategic spot for use.

The drawings show various alternative constructions and locations for the components that make up the locking system. Turning first to FIG. 1, there is shown the back end of a cargo bed 10 including the tailgate 12, sidewalls 14 and the floor 16. Extending out from the floor 16 is a locking cable 18. The spool that holds the cable 18 is not shown, because it is mounted to the floor 16 and underneath the floor. The end of the cable 18 includes a lug 20 that is inserted into and locked into a hole 22 in the pillar 24. While the cargo bed 10 is shown with specific designs and contours, the bed could be any vehicle cargo bed. The tailgate 12 is shown in the down position. The tailgate 12 is rotatably connected proximate the floor 16 and can be rotated up and down between open (down as shown) and up and closed positions. The pillar 24 is positioned at the back corner of the bed 10 and provides support for the sidewall 14 and the tailgate 12 when the tailgate is up and closed. The locking cable 18 is shown in an extended position. The lug 20 is just resting on the floor 16.

In FIG. 1, the cable 18 is shown in an extended position from a retractable cable spool. Alternatively, a cable 18 like that shown may be simply fixed to the floor or otherwise to the cargo bed or the vehicle generally so that a length of cable is simply available to lock down cargo as described. Therefore, while a retractable cable is one example, another example of the system described herein is simply an anchored cable that is then able to be locked on its unanchored end to the pillar in the back of a vehicle by using the locking mechanism with the tailgate.

Figure 2:
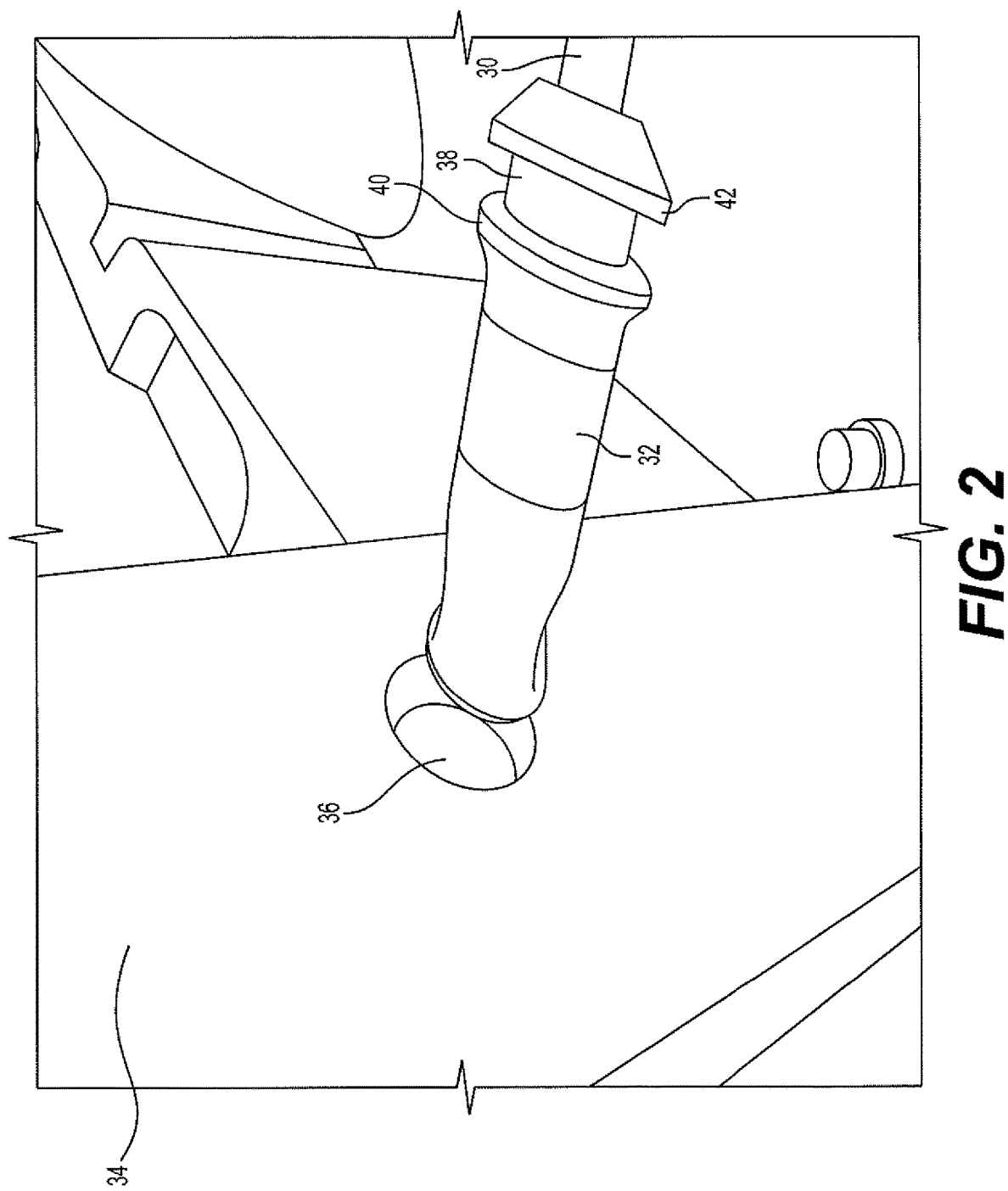
FIG. 2 is a perspective view of a cable lug as it may be inserted into a hole in the pillar of a truck bed.

FIG. 2 illustrates a truck bed pillar 34 with a hole 36 through the face of the wall. The hole 36 may be a factory hole in that the truck is regularly manufactured that way. Alternatively, a person could drill a hole such as hole 36 through the face of the pillar 34 at a height and position desirable for their purpose. In FIG. 2, a lug 32 is shown adjacent the hole 36. The lug 32 is sized to fit into the hole 36 up to a first flange 40 around the lug. In other words, the lug 32 may be inserted into the hole 36 up to the first flange 40 which is wider than the hole. The lug 32 also has a groove 38 machined therein and a second flange 42. The groove 38 is the reduced diameter portion of the lug 32 defined on each side by the first and second flanges 40 and 42. The lug 32 is secured to the end of the cable 30 that is shown only in part.

Figure 4:
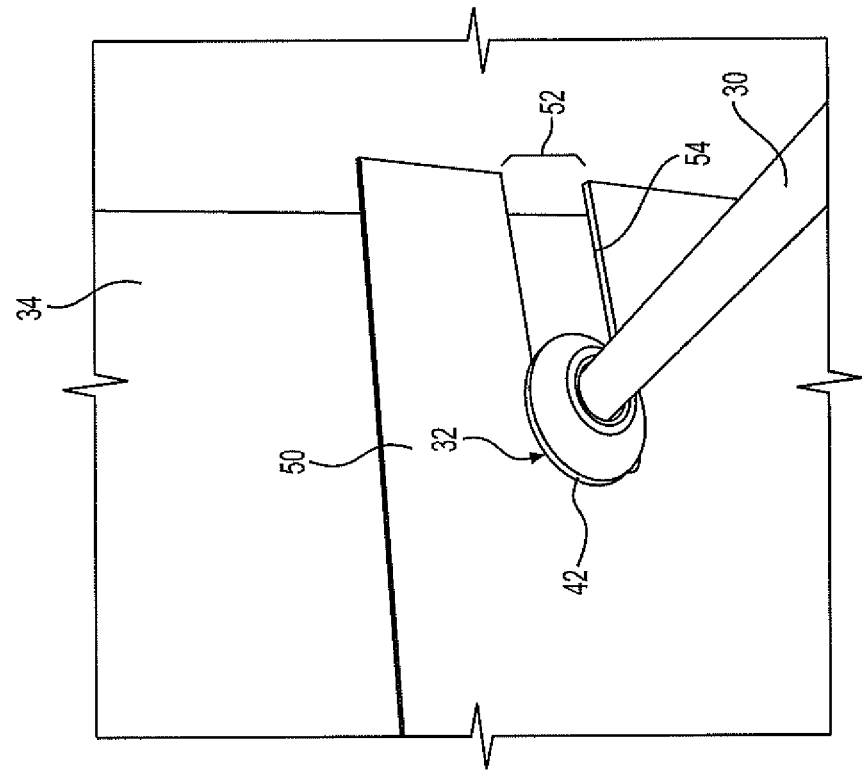
FIG. 4 is a perspective view of a lug that has been inserted into a hole in a truck bed pillar and that has been locked to the truck bed pillar.
Figure 3:
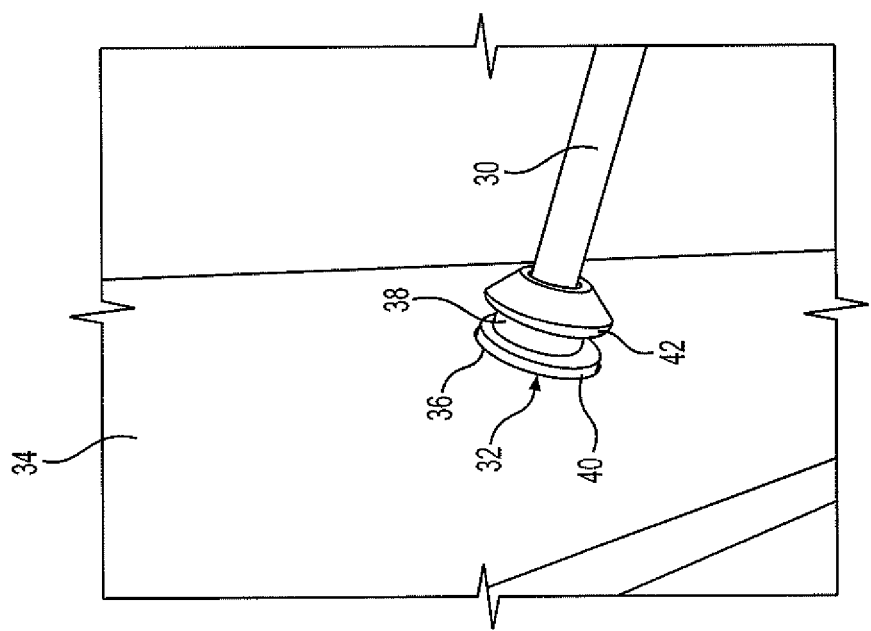
FIG. 3 is a perspective view of a lug that has been inserted into a hole in a truck bed pillar.

FIG. 3 shows the lug 32 fully inserted into the hole 36 up to the first flange 40. As can be seen, the groove 38 is fully accessible. In FIG. 4, a key 50 is slid over the lug 32 around the throat 52 (also referred to sometimes as key slot). The width of the throat 52 is greater than the diameter of the round groove 38, but it is less than the diameter of the first flange (not seen behind the key 50) and the second flange 42. And the thickness 54 of the key 50 is sized to be less that the linear width of the groove 38. Only the first end of the key 50 is shown in FIG. 4. However, this view illustrates the interlock between the key 50 and the lug 32 and specifically the throat 52 portion of the key.

Figure 6:
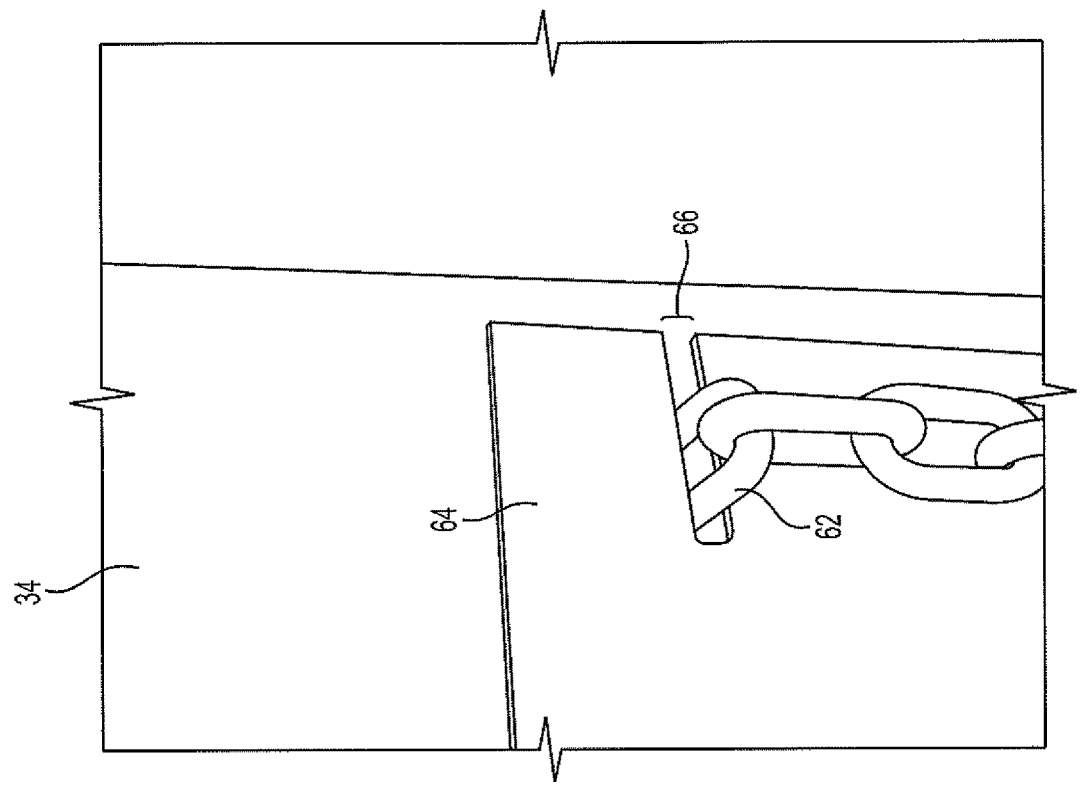
FIG. 6 is a perspective view of a chain that has been inserted into a hole in a truck bed pillar and that has been locked to the truck bed pillar.
Figure 5:
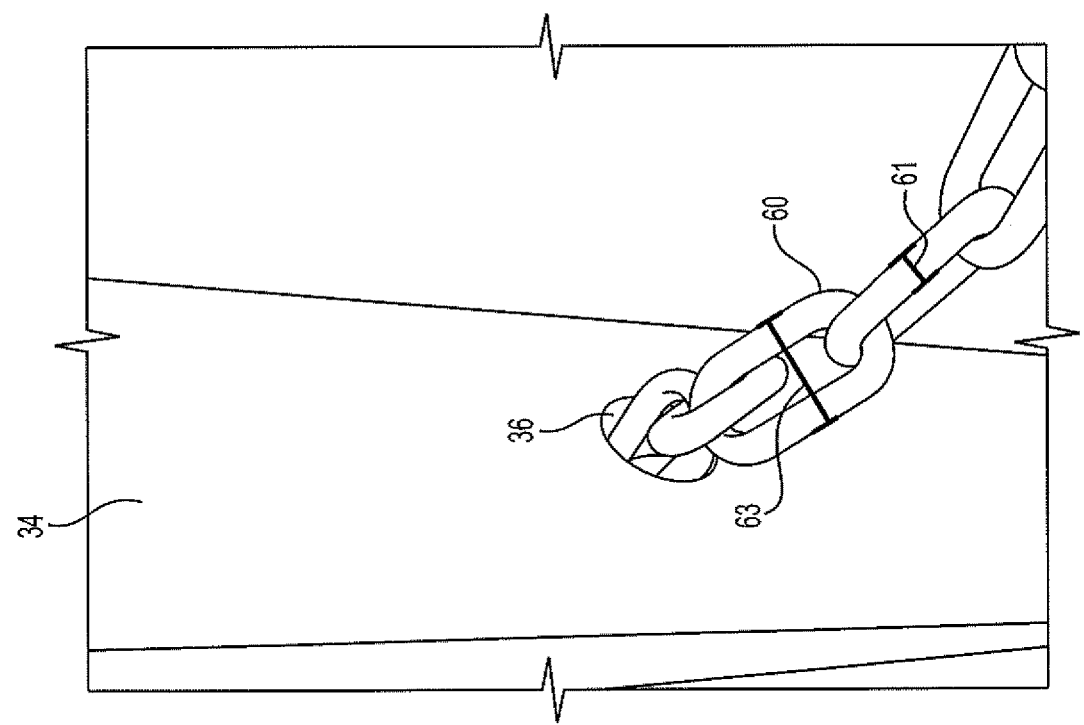
FIG. 5 is a perspective view of a chain that has been inserted into a hole in a truck bed pillar.

FIG. 5 shows a chain 60 that may be used to secure articles in a truck bed. The portion of the chain 60 that is shown is the front end of the chain that is not otherwise secured to the bed of the truck. The back end, not shown, would be secured to the truck bed, truck floor, truck wall or to a box or other component in the truck bed. The chain 60 is formed of a plurality of links 62 that have a thickness 61 and a width 63. One or several links of the chain 60 are sized in their width so that they are inserted into the pillar hole 36 that may be factory provided with a new truck or that may be drilled through the pillar by the truck owner or user. Then, to secure the chain 60 to the pillar 34, a key 64 is shown in FIG. 6. The key 64 has a throat 66 that is an open slot in the key 64. The width of the throat 66 is just slightly larger than the thickness 61 of a chain link 62 so that the throat slides over the link as shown. The throat 66 is narrow enough that the adjacent chain link has a width that prevents the chain from sliding out through the throat when the key is locked into the truck between the pillar 34 and tailgate (not shown).

Figure 7:
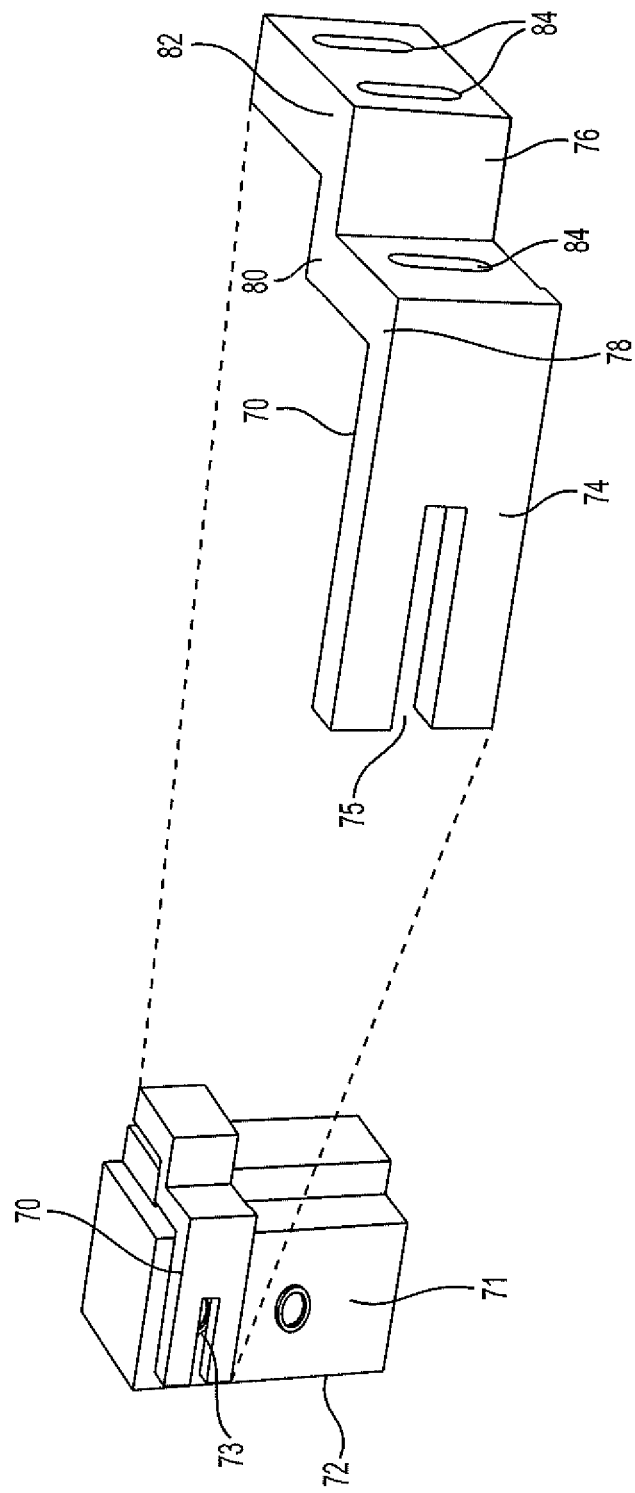
FIG. 7 is a perspective schematic view of a locking key mechanism and how it is contoured to fit around a truck pillar with a blow-up of the lock alone.

FIG. 7 shows one example of a key 70 as described herein. The key 70 is shown as matching the contours of an example of one type of pillar 72. The pillar 72 has a hole 73 on a face 71 of the pillar. As shown in the close-up portion of the FIG. 7, the key 70 has a front end 74 with a slot or throat 75 formed therein. The slot 75 will engage a portion of a lug, not shown, to secure that lug to the pillar 72. The contour of the key 70 is defined by three 90-degree turns 78, 80 and 82 so that the key will fit flush with the pillar 72 as shown. This particular zig-zag construction of a key 70 is just one example of a key. Alternative keys could have just one or two 90-degree turns such as turns 78 and 80. In this way, the second end 76 of the key 70 will be secured between a tailgate and the pillar when the tailgate is closed.

The faces of the second end 76 of the key 70 may have cushions 84 attached to them, for instance made of a rubber material, to engage the tailgate in the friction fit with the pillar 72. As noted earlier, in an example of a truck with a steel bed, the key 70 may alternatively include magnets on the face of the key opposite to that shown in FIG. 7 so that the key will be retained thereon when the tailgate is being shut. Still further alternatively, the key 70 may have adhesive strips on the opposite side as shown in FIG. 7 to retain the key on the pillar when a tailgate is being shut.

Figure 8:
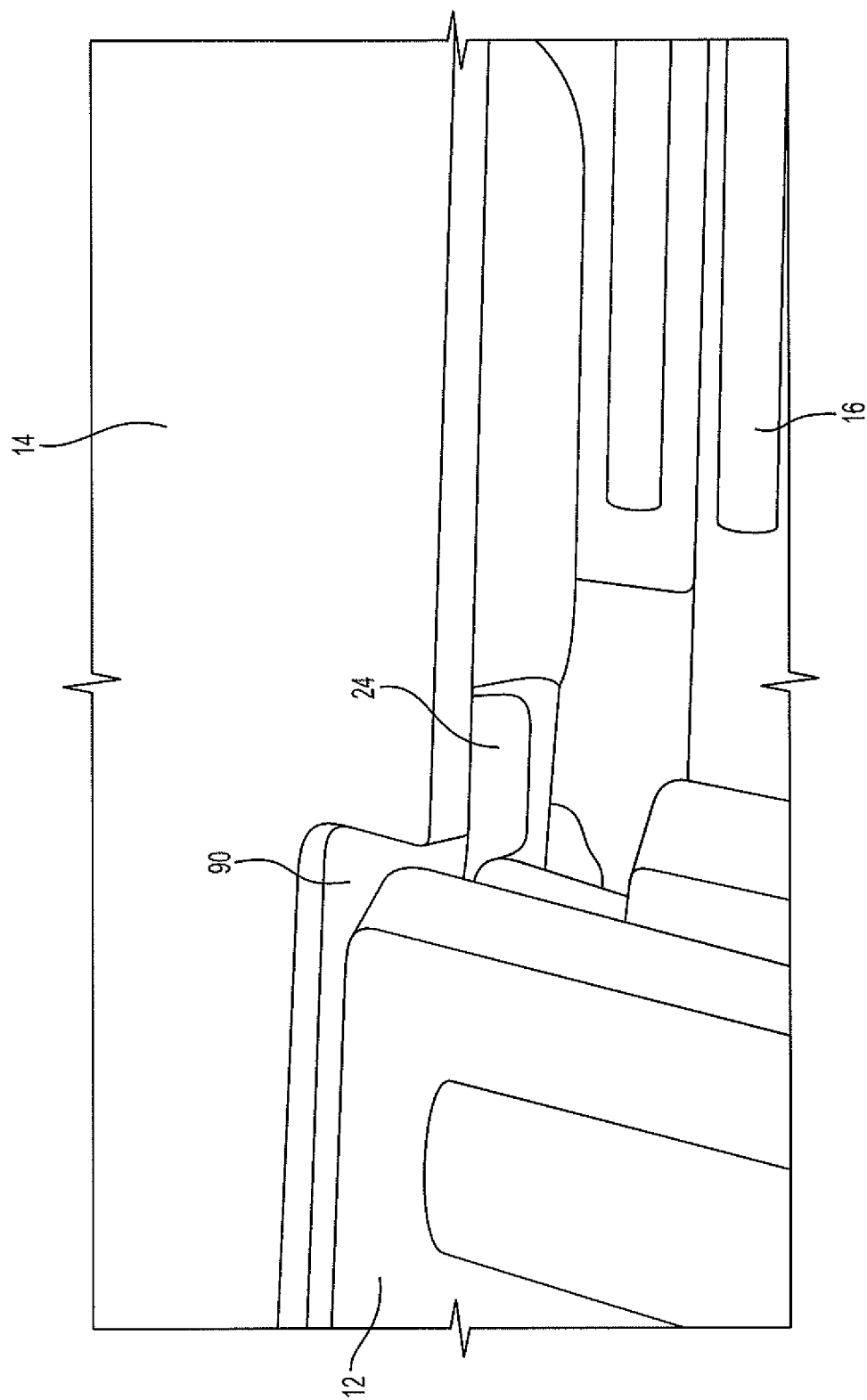
FIG. 8 is a perspective view of a portion of the back of a truck highlighting the gap between the tailgate and the truck bed pillar

FIG. 8 illustrates the tailgate 12 and sidewall 14 and bed floor 16 in the closed position with the tailgate latched to the pillar 24. As shown here, and as found in most or all pickup trucks, for instance, there is a gap 90 between the tailgate 12 and pillar 24 when in this latched, closed position. It is this gap 90, and its specific contour, that is matched by the contour of a key that may be locked between them.

Figure 9:
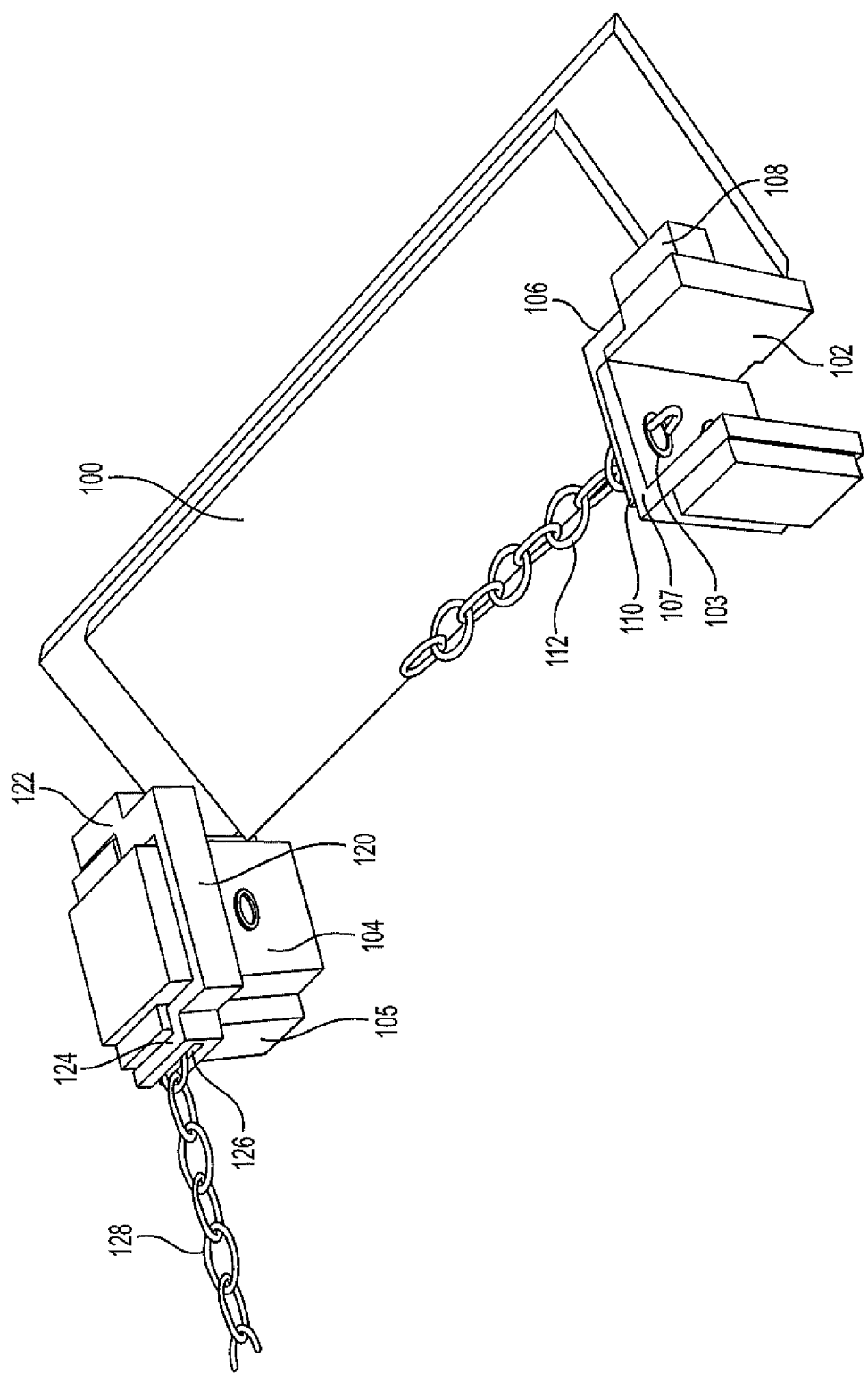
FIG. 9 is a perspective schematic view of the back of a truck bed illustrating two different kinds of key lock devices securing a chain to the respective pillars.

FIG. 9 illustrates a tailgate 100 that is adapted to be closed onto pillars 102 and 104 of a single vehicle. Keys 106 and 120 are shown as they contour to the pillars 102 and 104 respectively. Turning first to pillar 102, there is shown a face 107 that is perpendicular to a closed tailgate 100. This face 107 has a hole 103 therein. The key 106 has a first end 107 that includes a throat, not shown, and a second end 108 that is contoured to fill the gap between the tailgate 100 and pillar 102. A chain 112 is secured in the first end 107 of the key 106. This key 106 has the three 90-degree turns similar to that shown in FIG. 7. Turning now to key 120, there is shown two zig-zag ends 122 and 124. The first end 124 wraps around to lay against the front wall 125 of pillar 104. Therefore, this contour shows three 90-degree turns on the second end 122 as well three 90-degree turns on the first end 124. As explained earlier, different pillar geometries may call for fewer and possibly more turns such as the 90-degree turn shown, and the angles of those turns may be more or less than 90 degrees depending on a vehicle structure. The second key 120 has a throat 126 that slides over a chain 128 link and secures it in a hole, not shown, in the front face 125 of the pillar 104. Only the free ends of chains 112 and 128 are shown. Those chains 112 and 128 are secured to the vehicle bed on their opposite ends. And in one embodiment, the chains 112 and 128 might be the same chain that is secured on opposite ends to the respective pillars 102 and 104.

Figure 10:
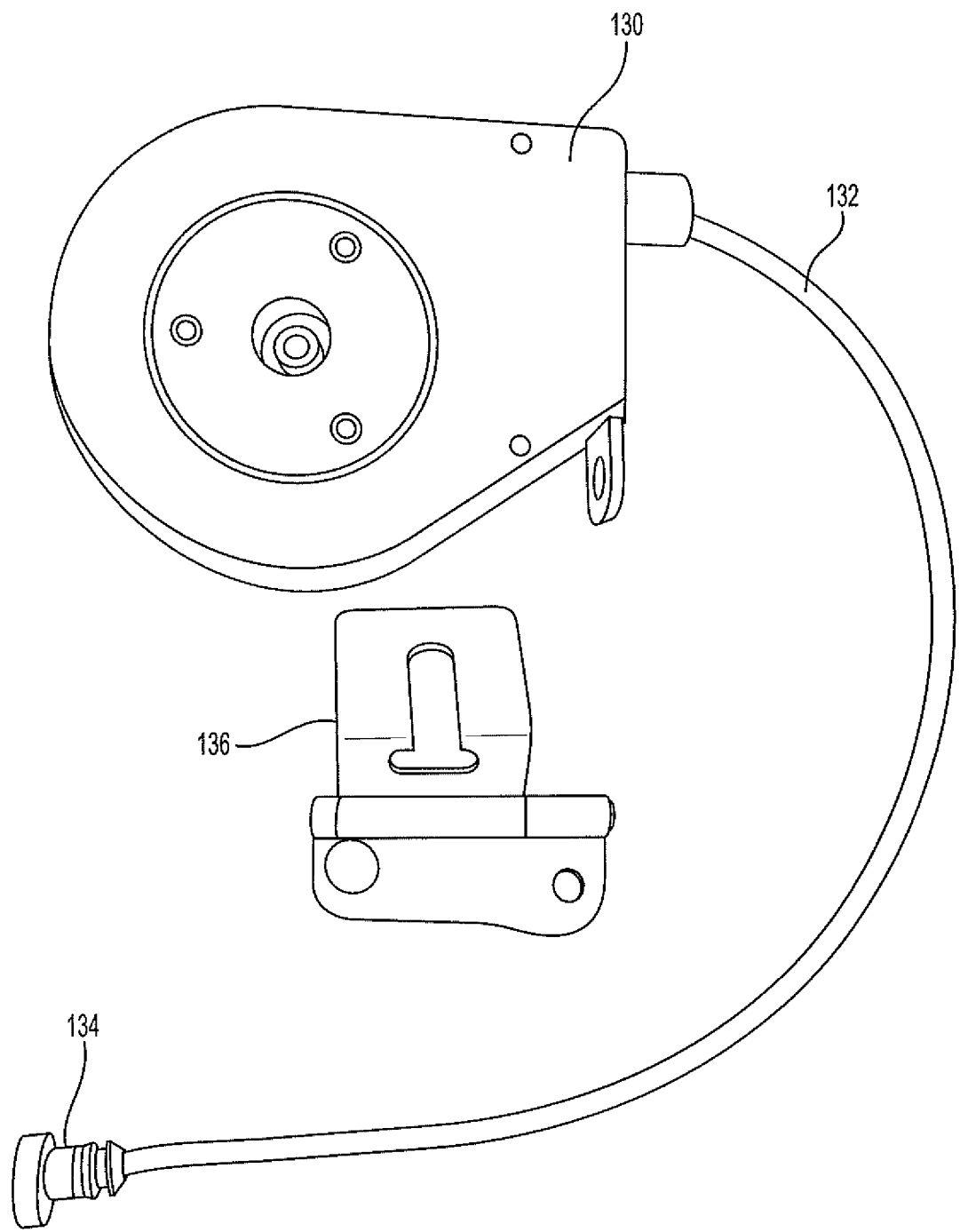
FIG. 10 is a perspective view of a kit with a retractable cable with a lug and a second embodiment of a key lock device.

FIG. 10 is a simple illustration of a kit that includes a spool 130 with cable 132 wound therein. At the opposite end of the cable 132 from the spool 130 is a lug 134 which is an example of a lug as described herein. There is further a key 136 that is adapted to be secured to a vehicle bed pillar. This kit of items in FIG. 10 might be sold to a truck owner for installation in a truck bed to provide the locking mechanism described herein.

Figure 11:
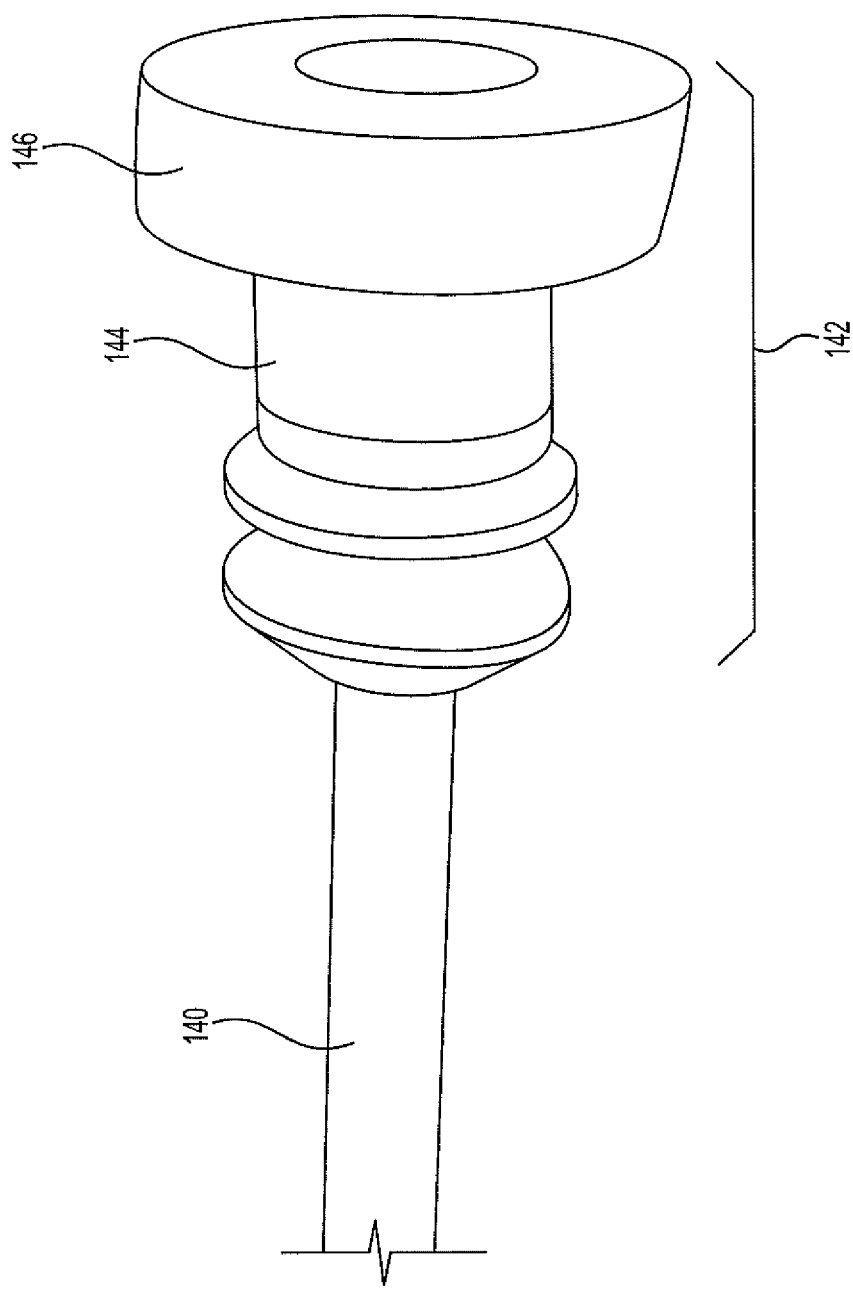
FIG. 11 is a perspective view of the alternative embodiment of a lug fixed to the end of a cable.

FIGS. 11-21 illustrate a different embodiment of a locking mechanism as described herein. There is common numbering throughout FIGS. 11-16 as they show the interaction of the lug and key of this embodiment. Turning first to FIG. 11, there is shown a cable 140 with a lug 142 fixed to the end of the cable. The lug 142 includes a middle portion 144 and a block end 146. The middle portion 144 has a more narrow diameter than the block end 146. As shown, the block end 146 is a round cylinder. The block end 146 may be alternative shapes with the only requirement that it is larger in width diameter than the middle portion 144.

Figure 12A:
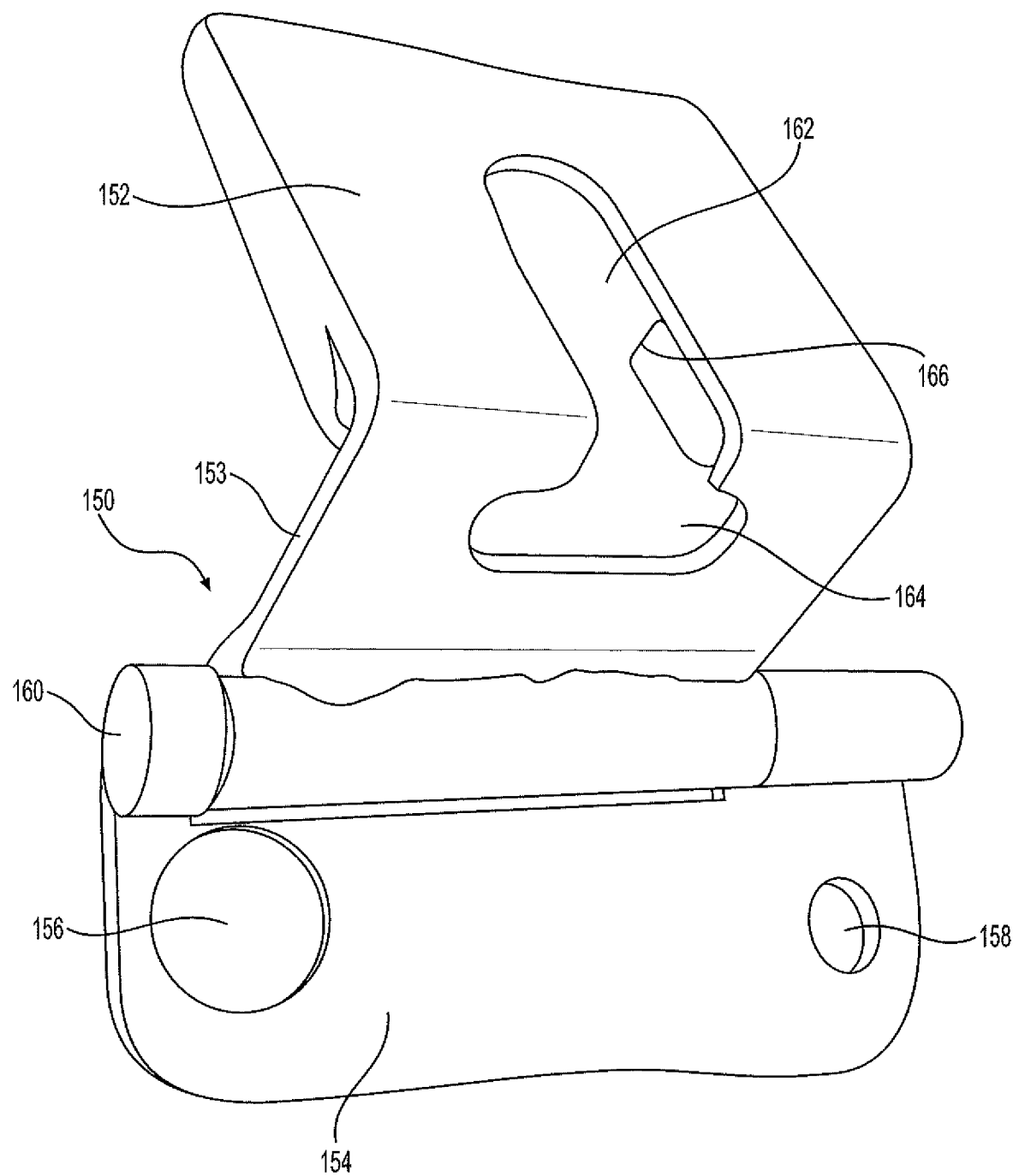
FIG. 12A is a front perspective view of the alternative embodiment of a key.
Figure 12B:
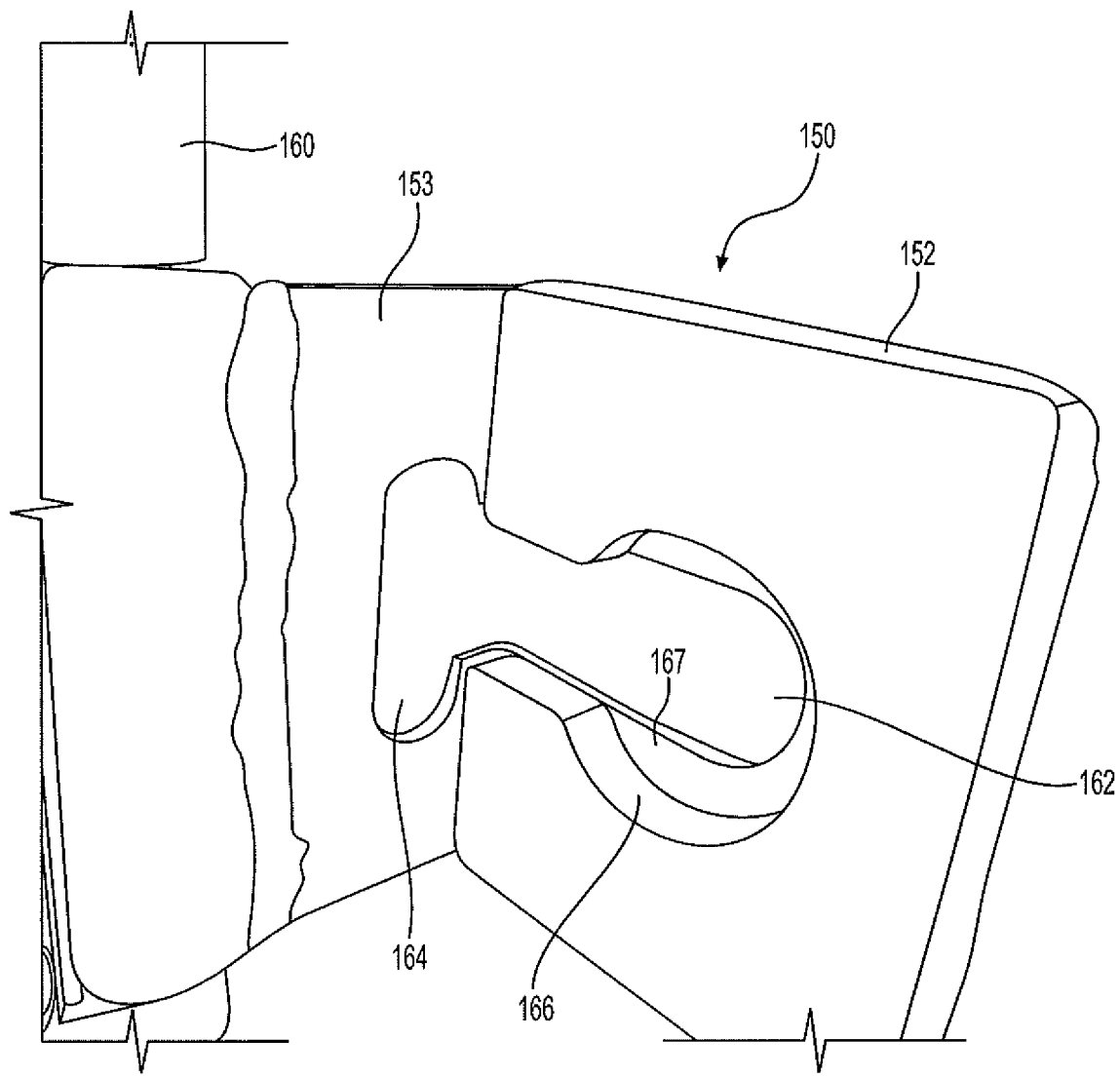
FIG. 12B is a back perspective view of the alternative embodiment of a key as shown in FIG. 12A.

FIGS. 12A (front side) and 12B (back side) illustrate a hinged key 150. The hinged key 150 has a first end 152, a middle section 153 and a second end 154. The second end 154 has holes 158 and 156 that correspond to factory installed, or alternatively user installed, bolts that secure the second end to a truck pillar. This second end 154 is connected by a hinge 160 to a middle portion 153. The middle portion 153 then has a 90-degree bend that rigidly connects it to the first end 152. The first end has a narrow throat 162 that defines a narrow slot in the first end. The middle portion 153 has a wide groove 164 therein that is openly connected to the throat 162 in the first end. The wide groove 164 is sized to receive and be slightly larger that the block end of a lug. The shape of the wide groove 164 may be similar to the cross-sectional shape of the block end, or it may be any shape that is larger and that allows the block end to pass through it. The width of the throat 162 must be greater than the width of a middle section of a lug, but less than the diameter of a block end of a lug. In this alternative shown, the first end 152 has a thickness that is comparable to the thickness of a block end. An extra sheet of metal 166 is included that enables a block end of a lug to seat within and next to and be retained by the first end 152 when the block end is inserted into the lock 150. The seat 167 is more visible in FIG. 12B which shows the back side of the first end 152. The seat 167 is where the lug block end may be nested in the first end 152 and flush along the back side.

Figure 13:
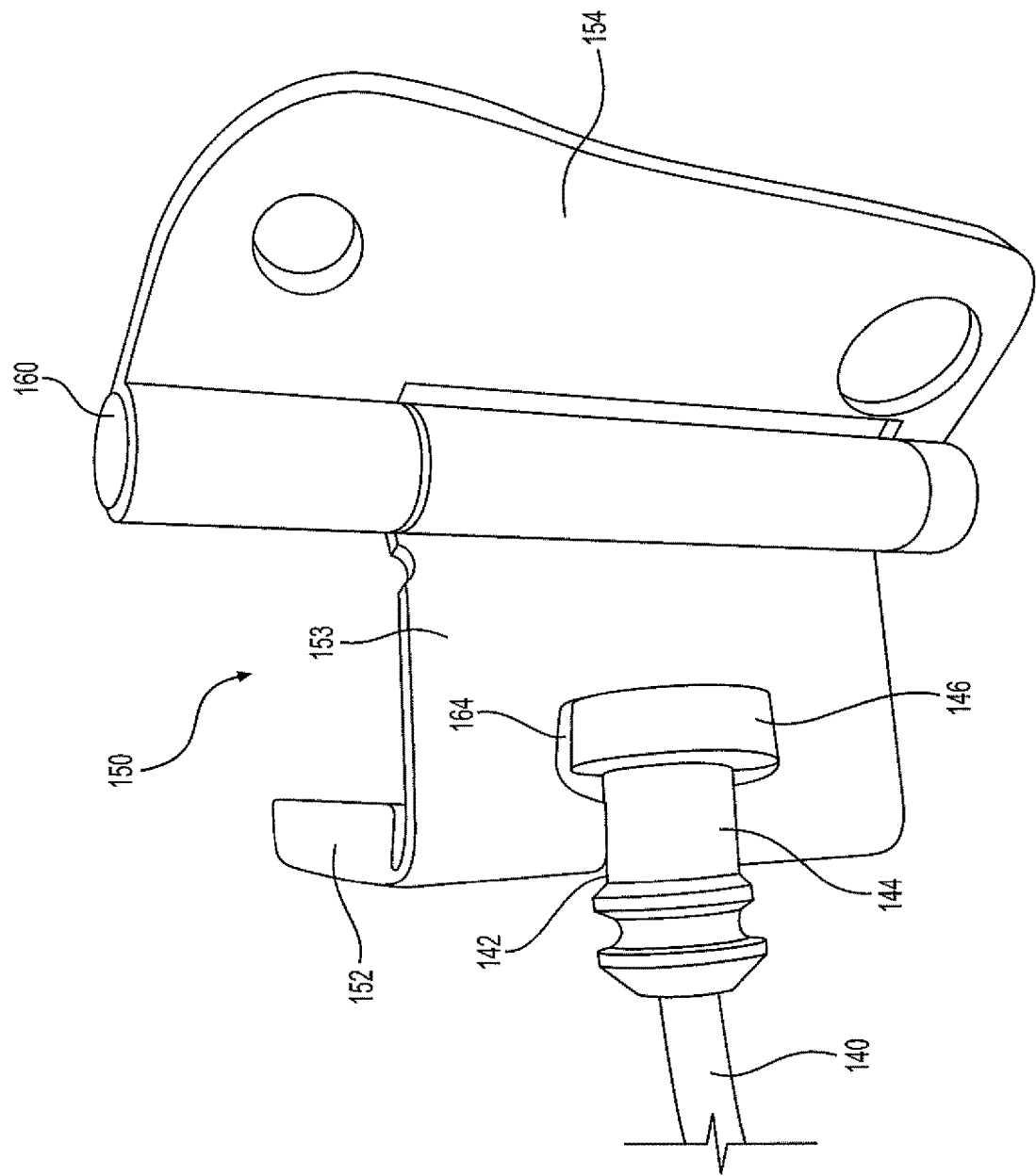
FIG. 13 is a rear perspective view of how a cable lug is inserted into the key locking mechanism.

FIG. 13 illustrates the first step in positioning the lug 142 into the key 150. The key 150 is as described with respect to FIG. 12. The lug 142 is described in FIG. 11. As shown in FIG. 13, the block end 146 of the lug 142 fits through the wide groove 164. The middle portion 144 of the lug fits through the throat 162. However, importantly, the block end 146 is too large to be pulled out through the throat 162. Therefore, the block end 146 is able to be inserted into the groove 164 and the lug 142 is able to be slid into the key 150. Through the middle portion 153 of the key.

Figure 14:
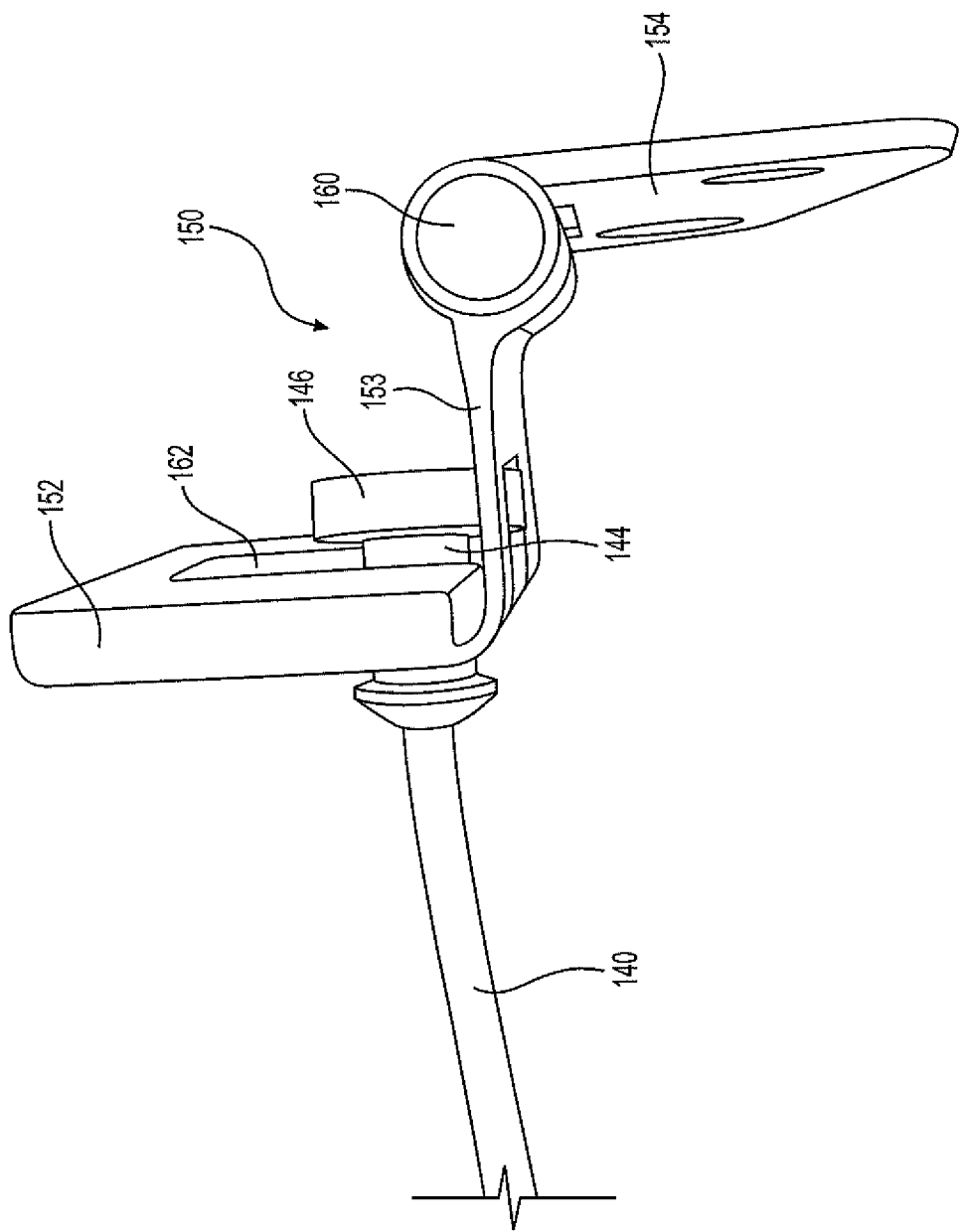
FIG. 14 is a top perspective view of a lug being inserted into a key locking device.
Figure 15:
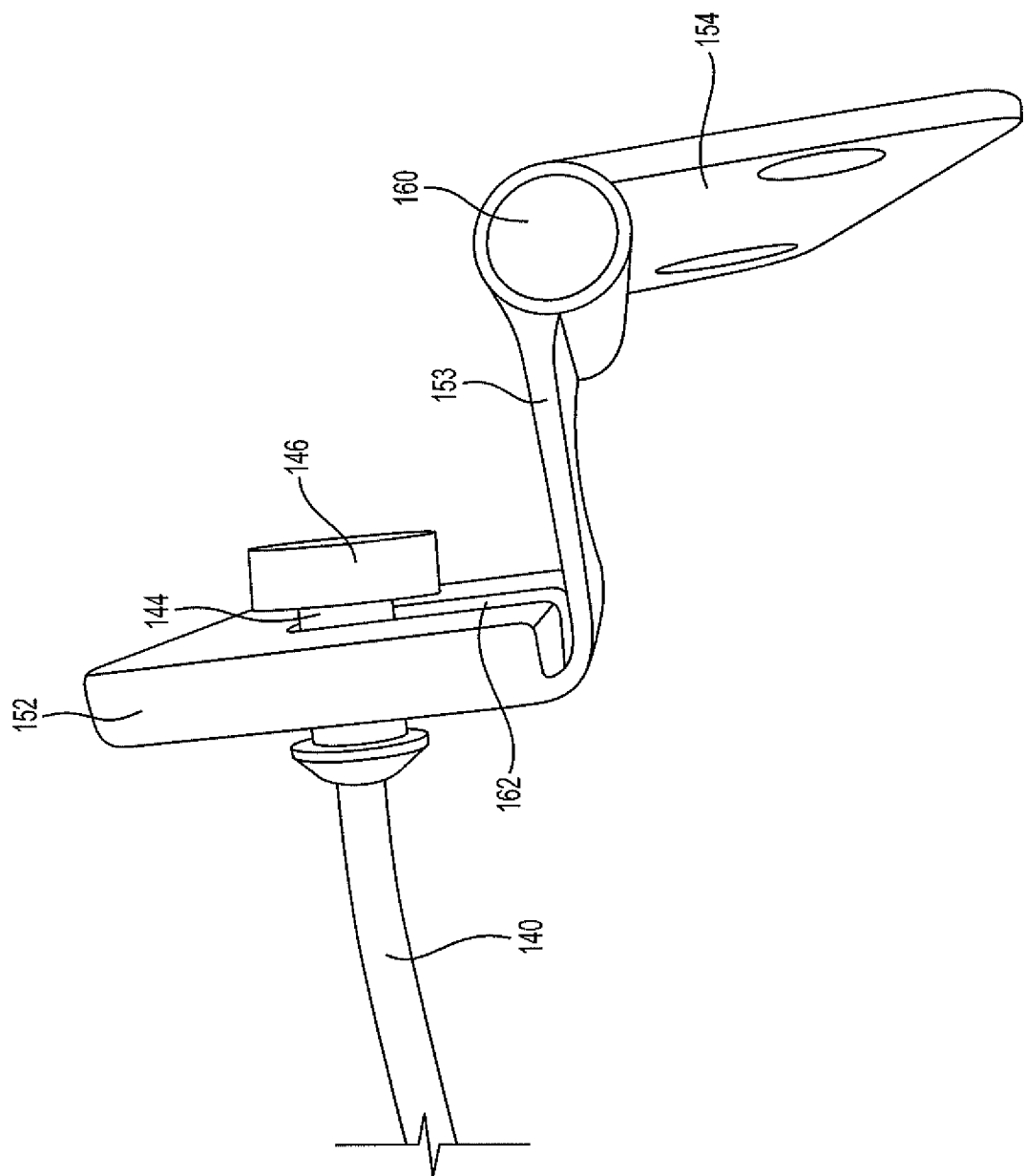
FIG. 15 is a top perspective view of a lug continuing to be inserted into a key locking device.

FIG. 14 illustrates the insertion of the lug 142 into the key 150 from a top view. In this view, the lug 142 is mostly through the middle portion 153 of the key 150 and is a part of the way up the throat 162 of the first end 152 of the key. The middle portion 144 of the lug 142 is able to slide along the length of the throat 162. The block end 146 of the lug 142 cannot be taken out of the key 150 except by sliding the lug backwards out of groove 164 (shown in FIG. 13). Similarly, FIG. 15 shows the lug 142 in its farthest position inside the first end 152 of the key 150. A person pulling on the cable 140 is not able to extract the lug 142 from the key 150 except by sliding the block end 146 backwards through the groove 164 (as seen in FIG. 13).

Figure 16:
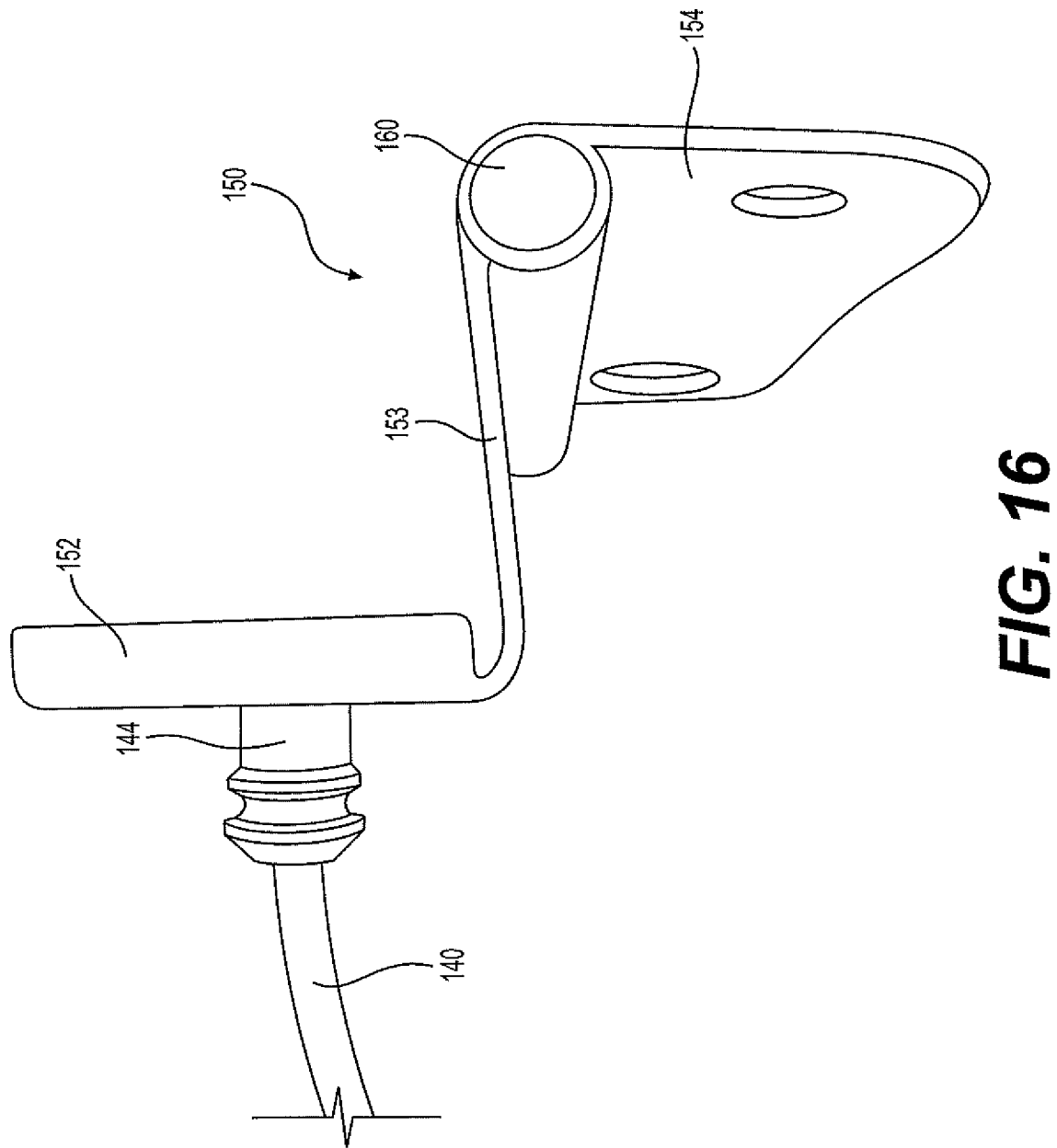
FIG. 16 is a top perspective view of a lug fully inserted into a key locking device.

In one embodiment of the key 150 as seen in FIG. 16, the first end 152 has a thickness that is greater than the thickness of the block end 146 of the lug 142. A shoulder is machined out of the first end 152 so that the block end 146 is able to seat inside the first end. Therefore, the block end 146 is not seen in FIG. 16 as it is seated completely within the thickness of the first end 152. In this way, the back side of the first end 152 is flat and may lay flat against a truck bed pillar.

Figure 17:
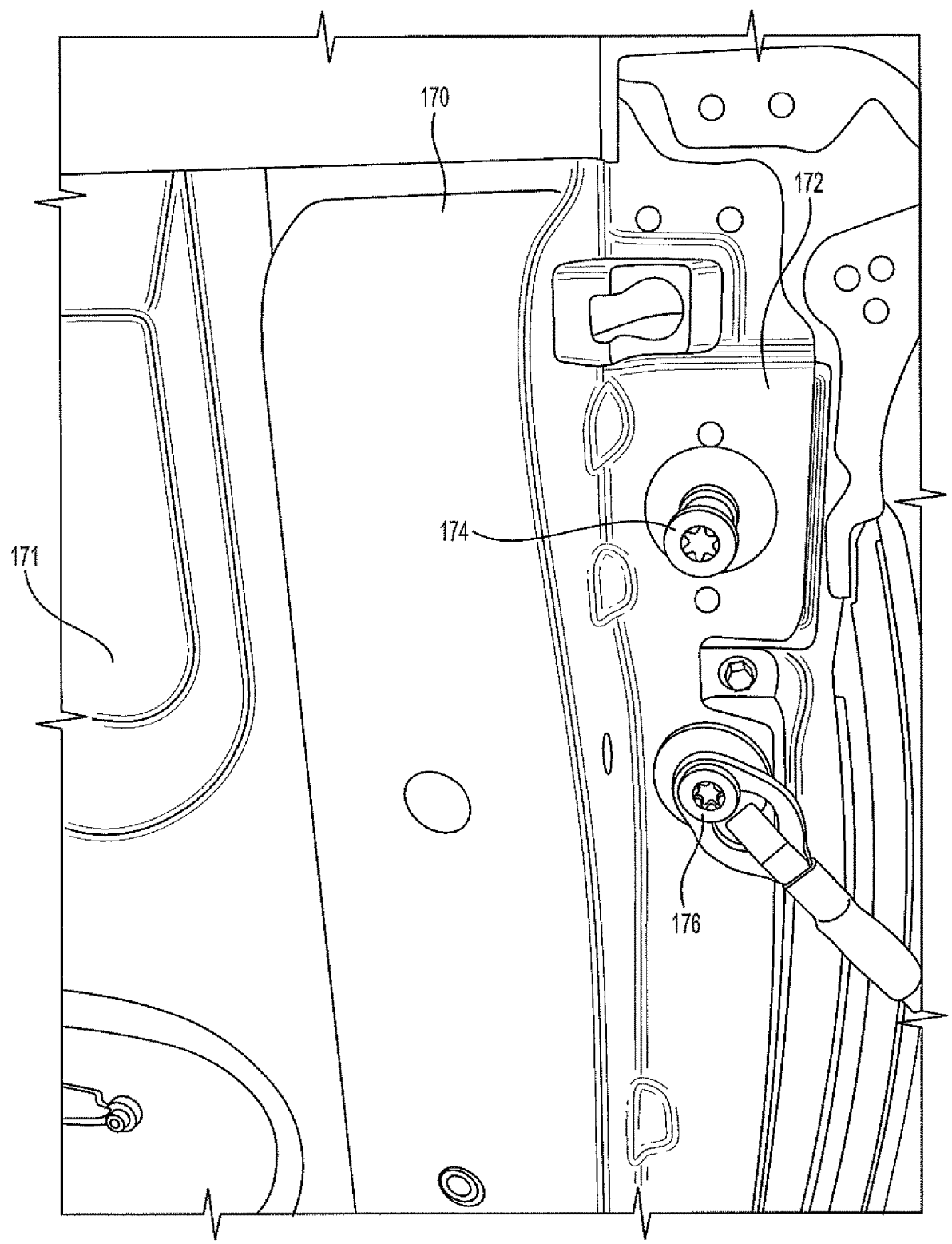
FIG. 17 is a perspective view of a regular truck pillar before a locking mechanism is mounted thereon.
Figure 18:
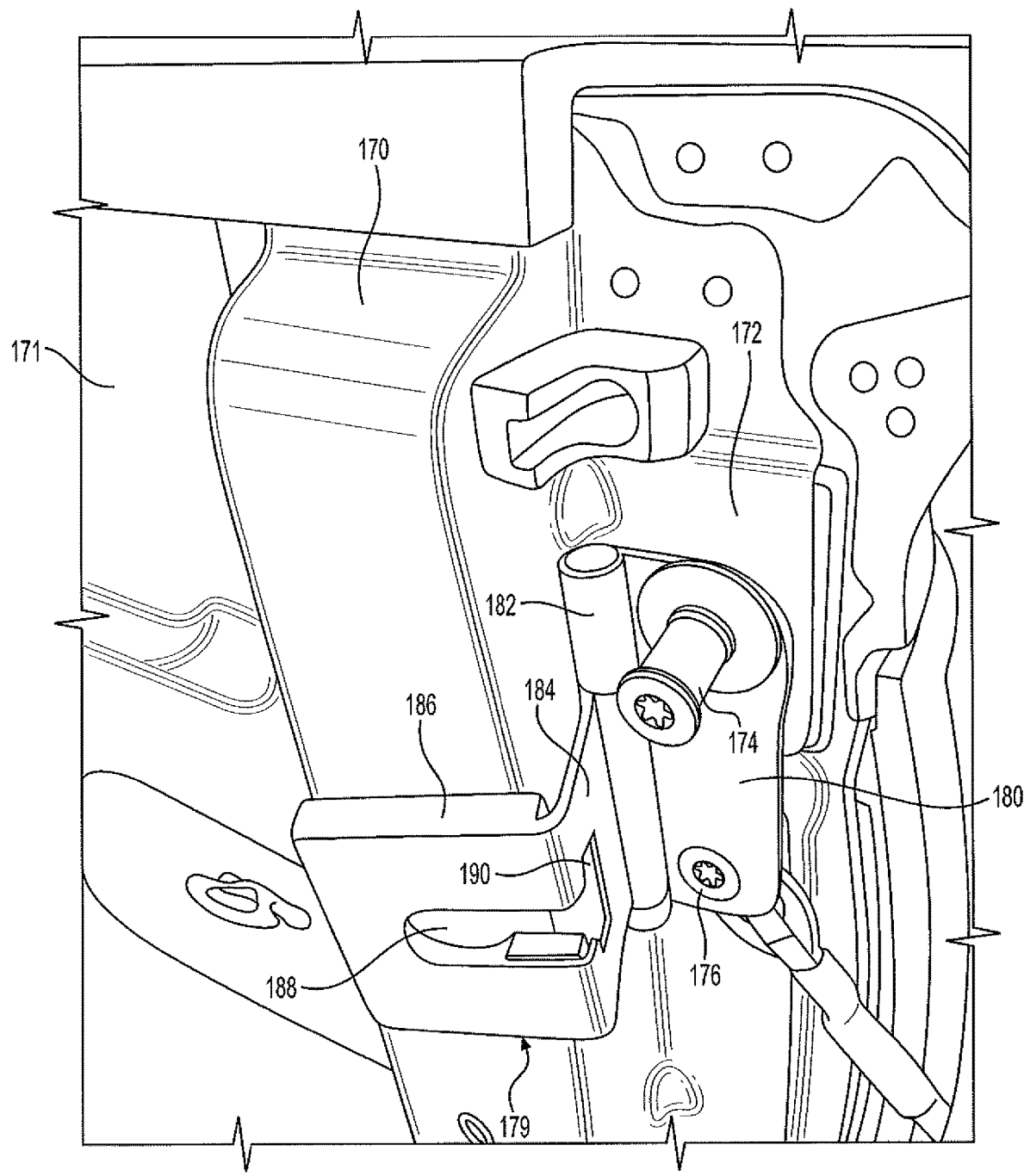
FIG. 18 is a perspective view of a regular truck pillar after a key locking mechanism has been mounted thereon.

FIGS. 17-21 illustrate the mounting of a key 179 onto a vehicle bed pillar 170. In FIG. 17, there is shown a conventional truck bed configuration. The bed has a sidewall 171 and a pillar 170. The pillar 170 has a stepped portion 172 onto which a latch bar 174 and a tailgate restraint cable anchor 176 are attached. In FIG. 18, a key 179 is secured to the pillar 170 on the pillar face 172. The second end 180 of the key 179 is secured to the pillar face 172 using the latch bolt 174 and the restraint cable anchor 176. The key 179 has a hinge 182 that connects the second end 180 to the middle portion 184. The first end 186 is connected by a 90-degree bend with the middle portion 184. The wide groove 190 in the middle portion 184 is shown as is the throat 188 in the first end 186.

Figure 19:
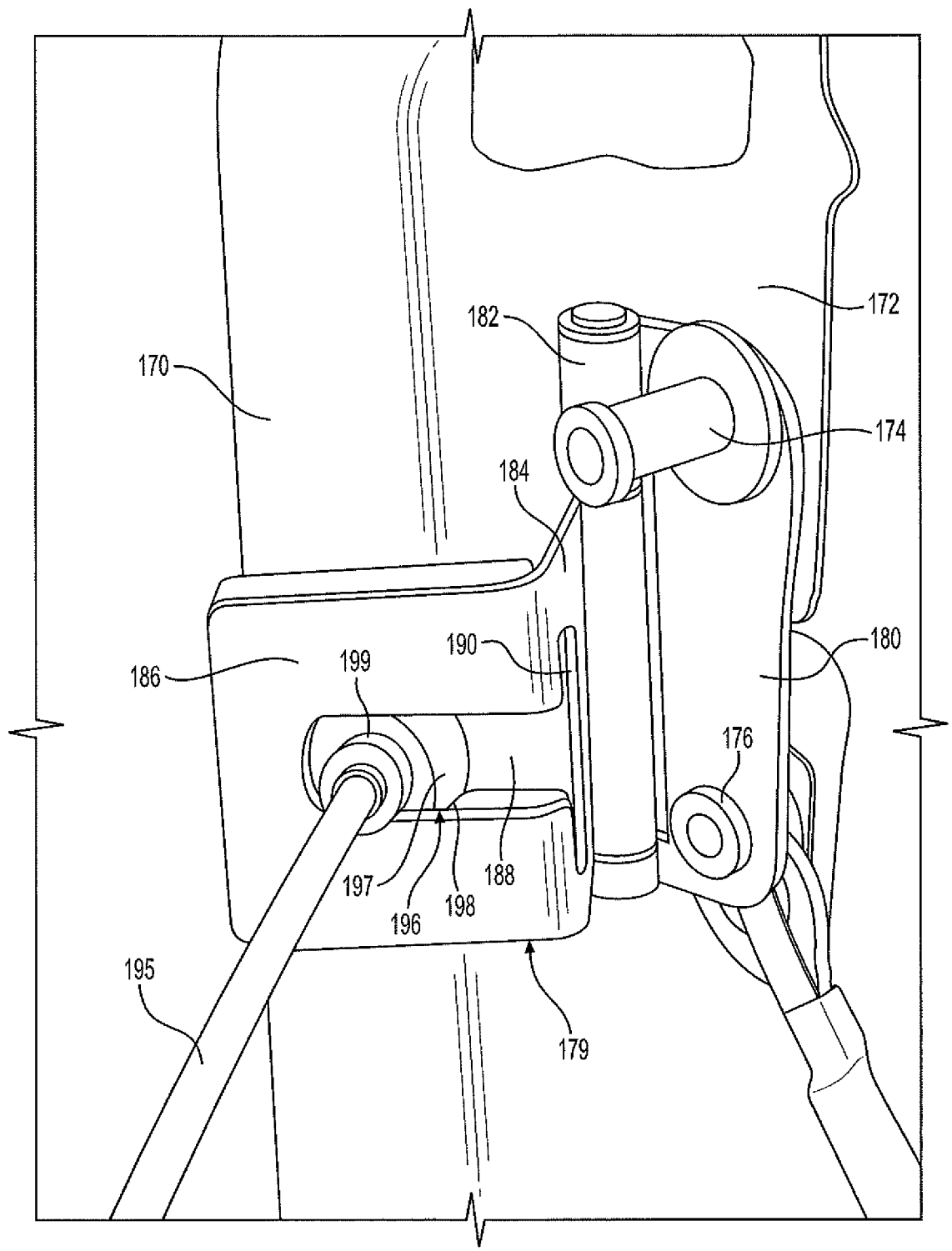
FIG. 19 is a perspective view of a lug being inserted into the open key lock device.
Figure 20:
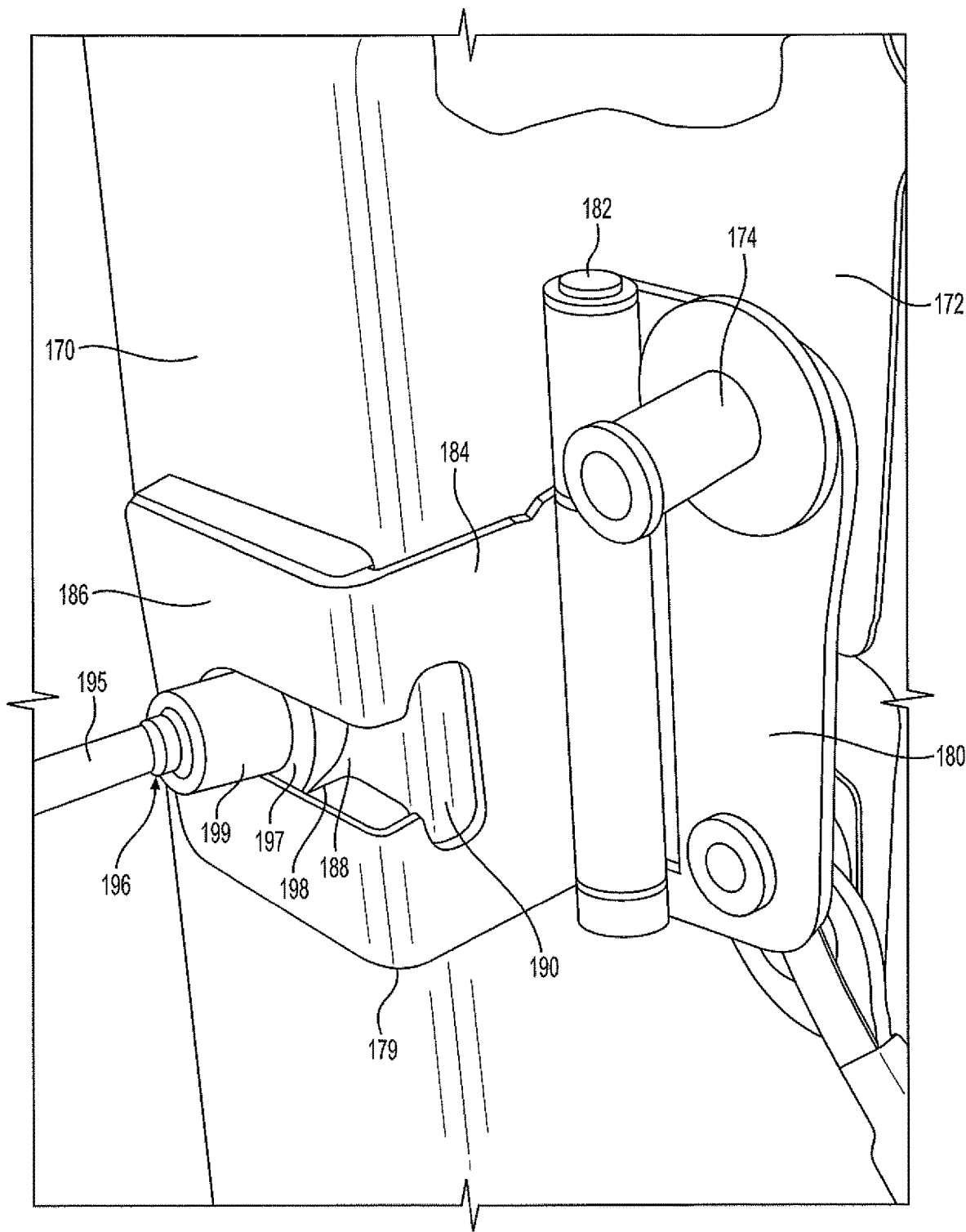
FIG. 20 is a perspective view of a lug locked into the key locking device and flush on the face of the pillar.
Figure 21:
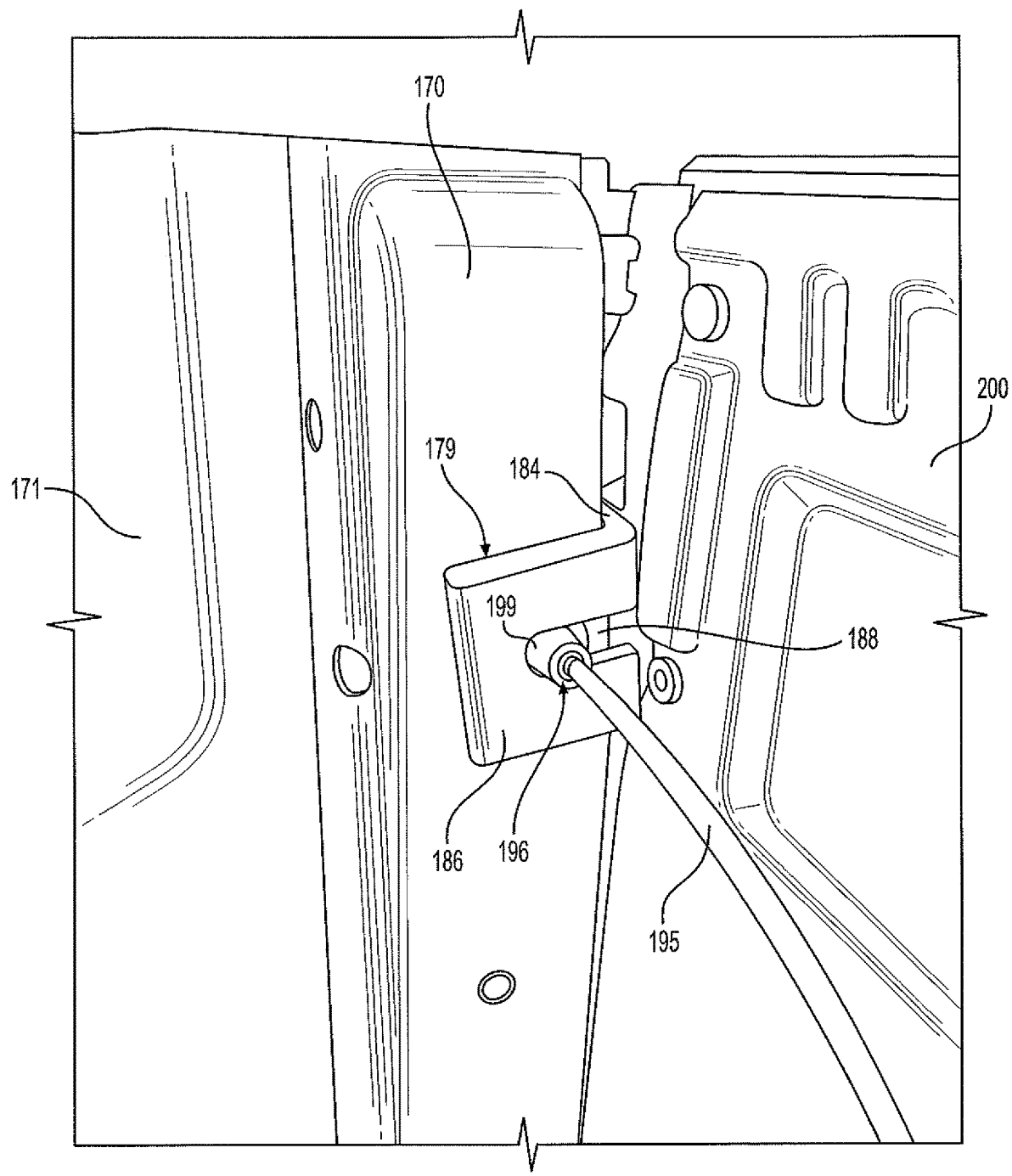
FIG. 21 is a perspective view of a lug locked into the key locking device and flush on the face of the pillar with the tailgate up and closed against the pillar.

In FIGS. 19 and 20, a lug 196 is shown being placed into the key 179. In FIG. 19, the front end 186 and middle portion 184 are shown in a rotated position of less than 90 degrees with respect to the second end 180. This leaves room behind the key 179 so that the lug block end 197 can be inserted through the groove 190 with the middle portion of the key 199 being able to slide down the throat 188. As described earlier, there is a shoulder 198 in the back of the first end 186 that provides a seat for the block end 197 to nest into it. Once seated, and as shown in FIG. 20, the first end 186 is then rotated around so that it is flat against the pillar 170. In this position, the middle portion 184 of the key 179 is substantially perpendicular to the second end 180. The contour of the key 179 in this closed position shown in FIG. 20 matches the contour of the gap between the pillar and sidewall once the tailgate is closed up in its vertical position with the tailgate latch locked to the latch bolt 174. The tailgate is not shown in these figures in order to have a clear view of the key operation. However, FIG. 21 shows the tailgate 200 in the upright and locked position onto the pillar 170. The first end 186 of the key 179 is seen securing the lug 196 in the throat 188 of the first end. The lug 196 and connected cable 195 cannot be removed from the key 179 until the tailgate 200 is unlocked and rotated down to its open position.

Figure 23:
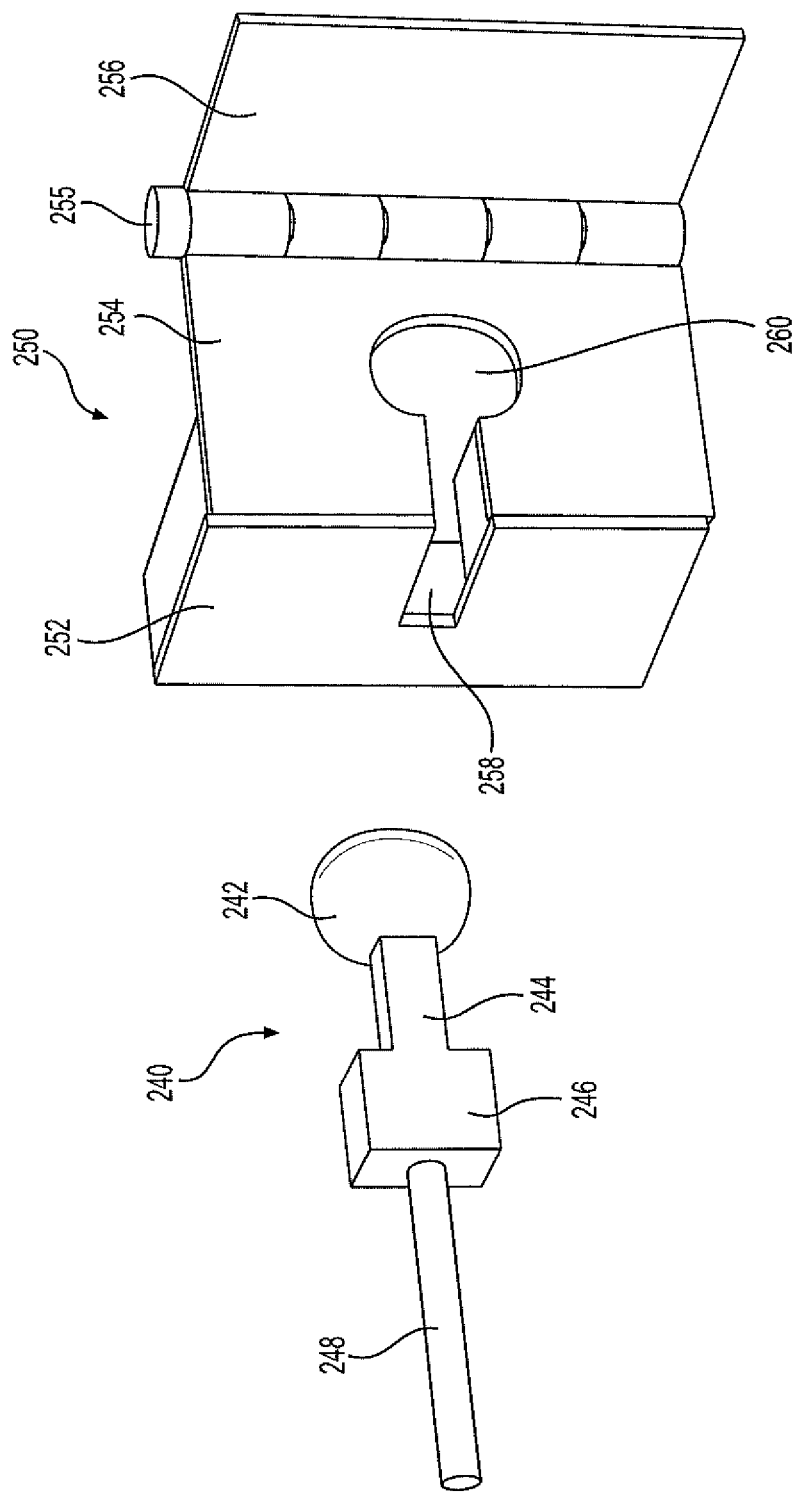
FIG. 23 is a perspective view of a still further alternative lug and key shape as described herein.

FIGS. 22 and 23 illustrate variations of the cable lugs 210 and 240 respectively. In FIG. 22, lug 210 is secured to an end of cable 218. The lug 210 includes a shoulder 216, a middle portion 214 and a block end 212. Unlike earlier examples shown in earlier figures, the middle portion is rectangular with parallel opposite sides. The block end 212 is a rectangular block. The key 220 has a first end 222, a middle section 224, a second end 226 and a hinge 225 between the middle portion and second end. The second end 226 is adapted to be secured to a vehicle bed pillar (not shown). The second end 226 and the hinge 225 and middle section 224 are sized to be mounted in the gap between a vehicle bed tailgate and pillar. The middle section 224 has an opening 230 sized and adapted to allow the lug block end 212 to fit through it. The throat 228 of the first end 222 receives and allows the middle portion 214 to slide through it. Unlike in earlier examples where the middle portion 214 is round, the parallel sides of the middle portion will simply slide in. In one example, the width of the lug middle portion 214 is slightly less than the width of the throat 228 slot. If the middle portion 214 is narrow, then it may still rotate around within the throat 228 slot.

FIG. 23 illustrates a lug 240 and accompanying key 250 where the shape of the lug block end 242 is a round sphere. The lug 240 is fixed to an end of the cable 248. The lug 240 has a shoulder 246, a middle portion 244 and the spherical block end 242. The key 250 has a first end 252, a middle section 254, a second end 256 and a hinge 255 between the middle section and second end. The lug 240 and key 250 are functionally the same as the lug 210 and key 220 in FIG. 22 but for the shape of the block end 242 and the shape of the middle portion hole 260. The block end 242 has a shape and size to fit through the opening 260 in the middle portion 254 of the key 250. Also, the seat (not shown) that is cut into the back side of the first end 252 would be a spherical shape to receive the block end 242.

Figure 24:
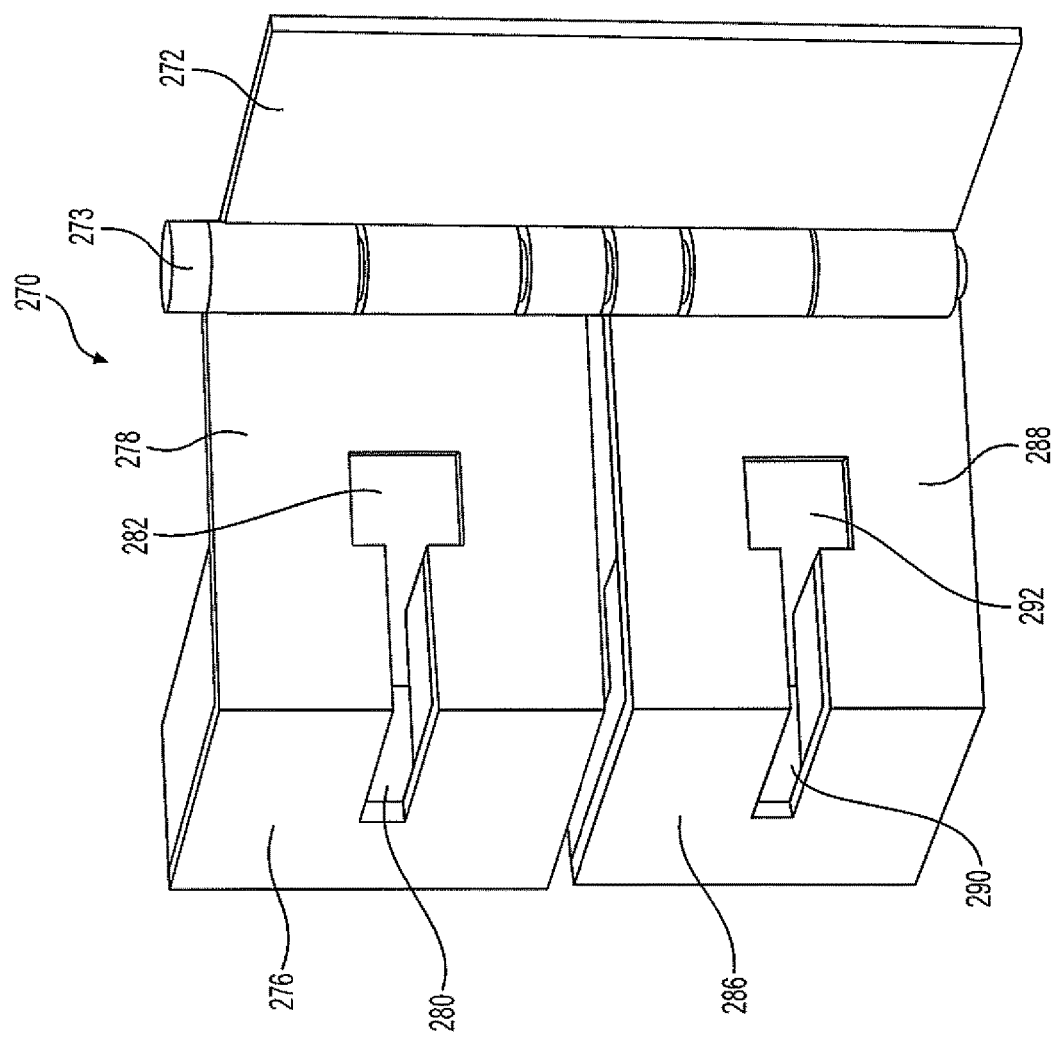
FIG. 24 is a perspective view of another example of a key having two throat slots and openings to receive two lugs.

FIG. 24 is another example of a key as described herein. In each of the foregoing examples, a key had a single throat and opening to receive a single end of a cable lug. However in this example in FIG. 24, there is shown a key 270 with two first ends 276 and 286 rigidly connected to two middle sections 278 and 288 respectively. The two middle sections 278 and 288 are connected by a hinge 273 to a second end 272. First ends 276 and 286 have throats 280 and 290 in them. The throats 280 and 290 are open to openings 282 and 292 respectively so that a lug block end (not shown) can be received in the first ends 276 and 286 as described and illustrated in FIGS. 11-16. With two first ends 276 and 286, the key 270 may receive a lug end from two different cables, or alternatively from the two opposite lug ends from a single cable. Also, key 270 shows two first ends 276 and 286 each separately rotatable around the hinge 273. It is alternatively possible that a single first end may have two or more throats and openings to allow multiple cable lug ends to be secured therein.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A cable locking system for use with vehicles having a tailgate, the system comprising:
    a vehicle having a cargo bed, wherein the cargo bed has a tailgate mounted on one end of the cargo bed and the tailgate having rotating open down and up latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed;
    a length of cable having a first end of the cable and a second end of the cable that is fixed to the cargo bed;
    a lug fixed onto the first end of the cable having a groove across its width and an end block having a diameter greater than a diameter of the groove;
    a contoured key having an open slot that is sized to slide across the lug groove and wherein the lug block is too large to come out of the slot; and further wherein the contoured key fits into the empty space between the closed tailgate and the corresponding pillar that it is attached to;
    whereby the lug on the cable may be inserted into the key so that the key and lug are locked when the tailgate is closed.

2. A cable locking system for use with vehicles having a tailgate as described in claim 1,
    wherein the cable spool is fixed underneath the floor of the cargo bed.

3. A cable locking system for use with vehicles having a tailgate as described in claim 1,
    wherein the lug is round in cross-section.

4. A cable locking system for use with vehicles having a tailgate as described in claim 1,
    wherein the lug is rectangular in cross-section.

5. A cable locking system for use with vehicles having a tailgate as described in claim 1,
    wherein the open slot of the contoured key is positioned in a first end of the contoured key, and a second end of the contoured key opposite the first end has a Z-shape as defined by two 90 degree turns.

6. A cable locking system for use with vehicles having a tailgate as described in claim 5,
    wherein the second end of the contoured key is fixed to the pillar face by a bolt.

7. A cable locking system for use with vehicles having a tailgate, the system comprising:
    a vehicle having a cargo bed, wherein the cargo bed has a tailgate mounted on one end of the cargo bed and the tailgate having rotating open down and up latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed;
    a length of cable having a first end of the cable and a second end of the cable that is fixed to the cargo bed;
    a lug fixed onto the first end of the cable having a groove across its width and an end block having a diameter greater than a diameter of the groove;
    a contoured key having an open slot that is open to the distal end of a first end of the key, and the slot is sized to slide across the lug groove and wherein the lug block is too large to come out of the slot; and further wherein the contoured key fits into the empty space between the closed tailgate and the corresponding pillar that it is attached to,
    the pillar has a hole therein that is sized slightly larger than the diameter of the outside of the lug end block, wherein the lug fits inside the hole in the pillar,
    whereby the lug on the cable is inserted into the hole in the pillar and the key is then slid across the lug groove so that the key and lug are locked when the tailgate is closed.

8. A cable locking system for use with vehicles having a tailgate as described in claim 7,
    wherein the lug is round in cross-section.

9. A cable locking system for use with vehicles having a tailgate as described in claim 7,
    wherein the lug is rectangular in cross-section.

10. A cable locking system for use with vehicles having a tailgate as described in claim 7,
    wherein a second end of the contoured key opposite the first end has a Z-shape as defined by two 90 degree turns.

11. A cable looking system for use with vehicles having a tailgate as described in claim 10,
    wherein the second end of the contoured key is fixed to the pillar face by a bolt.

12. A cable locking system for use with vehicles having a tailgate, the system comprising:
    a vehicle having a cargo bed, wherein the cargo bed has a tailgate mounted on one end of the cargo bed and the tailgate having rotating open down and up latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed;
    a length of cable having a first end of the cable and a second end of the cable that is fixed to the cargo bed;
    a lug fixed onto the first end of the cable having a groove across its width and an end block having a diameter greater than a diameter of the groove;
    a contoured key having an open slot that is open to the proximal end of a first end of the key, and the slot is sized to slide across the lug groove and wherein the lug block is too large to come out of the slot; and further wherein the contoured key fits into the empty space between the closed tailgate and the corresponding pillar that it is attached to,
    wherein the contoured key further comprises a hinge that allows the first end of the key to rotate forward and back and the forward position is next to and parallel to the longitudinal face of the pillar, whereby the lug on the cable is inserted into the slot in the key so that the key and lug are locked when the tailgate is closed.

13. A cable locking system for use with vehicles having a tailgate as described in claim 12, wherein the key has a second end opposite the first end and the second end comprises the hinge, and the second end further defines a Z-shape with two 90 degree turns when the first end is rotated next to the longitudinal face of the pillar.

14. A cable locking system for use with vehicles having a tailgate as described in claim 12, wherein the contoured key comprises a second open slot that is open to the proximal end of the first end of the key, and the slot is sized to slide across a second lug groove and wherein a second lug block is too large to come out of the slot.

\* \* \* \* \*